US012701610B2

(12) United States Patent
Stefanatos et al.

(10) Patent No.: US 12,701,610 B2
(45) Date of Patent: Aug. 4, 2026

(54) SUBCHANNEL-BASED LISTEN BEFORE TALK FOR UNLICENSED CHANNEL ACCESS

(71) Applicant: QUALCOMM Incorporated, San Diego, CA (US)

(72) Inventors: Stelios Stefanatos, San Diego, CA (US); Shuanshuan Wu, San Diego, CA (US); Peter Gaal, San Diego, CA (US); Xiaoxia Zhang, San Diego, CA (US); Tao Luo, San Diego, CA (US); Arthur Gubeskys, San Diego, CA (US); Jing Sun, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 592 days.

(21) Appl. No.: 17/999,350

(22) PCT Filed: Jul. 15, 2021

(86) PCT No.: PCT/US2021/041804
§ 371 (c)(1),
(2) Date: Nov. 18, 2022

(87) PCT Pub. No.: WO2022/020172
PCT Pub. Date: Jan. 27, 2022

(65) Prior Publication Data
US 2023/0189336 A1      Jun. 15, 2023

(30) Foreign Application Priority Data
Jul. 20, 2020      (GR) ............................... 20200100426

(51) Int. Cl.
*H04W 74/08*      (2024.01)
*H04W 74/0808*      (2024.01)

(52) U.S. Cl.
CPC .............................. *H04W 74/0808* (2013.01)

(58) Field of Classification Search
CPC .................................................. H04W 74/0808
See application file for complete search history.

(56) References Cited

U.S. PATENT DOCUMENTS

| | | | |
|---|---|---|---|
| 10,278,177 B2 | 4/2019 | Sadek et al. | |
| 12,262,276 B2 | 3/2025 | Freda et al. | |
| (Continued) | | | |

FOREIGN PATENT DOCUMENTS

| | | |
|---|---|---|
| CN | 111316737 A | 6/2020 |
| EP | 3849261 A1 | 7/2021 |
| (Continued) | | |

OTHER PUBLICATIONS

International Search Report and Written Opinion—PCT/US2021/041804—ISA/EPO—Nov. 17, 2021.
(Continued)

*Primary Examiner* — Pamit Kaur
(74) *Attorney, Agent, or Firm* — Patterson & Sheridan, L.L.P/QUALCOMM Incorporated

(57) ABSTRACT

Certain aspects of the present disclosure provide techniques for subchannel-based listen before talk (LBT). An example method that may be performed by a user equipment (UE) includes receiving one or more transmissions indicating one or more allocated subchannels of a frequency band that are allocated during a first time period, the frequency band comprising the one or more allocated subchannels and one or more unallocated subchannels during the first time period; sensing the one or more unallocated subchannels for at least a portion of the first time period prior to a second time period; and transmitting a signal within the frequency band
(Continued)

□ PSSCH  ▨ First UE transmission  ▨ Second UE transmission  ▦ Third UE transmission  ▨ Fourth UE transmission during the second time period based on energy sensed for the one or more unallocated subchannels being less than a threshold.

30 Claims, 18 Drawing Sheets

(56)                References Cited

U.S. PATENT DOCUMENTS

| | | | |
|---|---|---|---|
| 2003/0210672 A1* | 11/2003 | Cromer | H04L 47/11 |
| | | | 370/468 |
| 2007/0213065 A1 | 9/2007 | Kang et al. | |
| 2008/0096496 A1 | 4/2008 | Yoon | |
| 2008/0298450 A1* | 12/2008 | Zhang | H04W 72/0453 |
| | | | 375/227 |
| 2011/0228666 A1 | 9/2011 | Barbieri et al. | |
| 2012/0069766 A1 | 3/2012 | Fu et al. | |
| 2016/0226637 A1* | 8/2016 | Nory | H04W 72/23 |
| 2017/0078887 A1 | 3/2017 | Barriac et al. | |
| 2017/0202043 A1 | 7/2017 | Seo | |
| 2018/0368090 A1 | 12/2018 | Kadambar et al. | |
| 2019/0116012 A1 | 4/2019 | Nam et al. | |
| 2019/0150157 A1 | 5/2019 | Panteleev et al. | |
| 2019/0281587 A1 | 9/2019 | Zhang et al. | |
| 2020/0044814 A1 | 2/2020 | Kim et al. | |
| 2020/0100116 A1 | 3/2020 | Chakraborty et al. | |
| 2022/0150968 A1* | 5/2022 | Fehrenbach | H04W 72/23 |
| 2023/0095560 A1 | 3/2023 | Stefanatos et al. | |
| 2023/0164578 A1 | 5/2023 | Gubeskys et al. | |
| 2023/0171808 A1 | 6/2023 | Wu et al. | |
| 2023/0180188 A1 | 6/2023 | Wu et al. | |
| 2023/0189082 A1 | 6/2023 | Stefanatos et al. | |
| 2023/0208690 A1 | 6/2023 | Wu et al. | |
| 2023/0209601 A1 | 6/2023 | Stefanatos et al. | |
| 2023/0217487 A1 | 7/2023 | Gubeskys et al. | |
| 2023/0224096 A1 | 7/2023 | Gubeskys et al. | |
| 2023/0224965 A1 | 7/2023 | Stefanatos et al. | |
| 2023/0232448 A1 | 7/2023 | Stefanatos et al. | |
| 2023/0300809 A1 | 9/2023 | Kusashima et al. | |

FOREIGN PATENT DOCUMENTS

| | | | |
|---|---|---|---|
| KR | 20200029356 A | | 3/2020 |
| WO | 2015034945 | | 3/2015 |
| WO | 2018171475 | A1 | 9/2018 |
| WO | 2019036578 | A1 | 2/2019 |
| WO | 2020024854 | A1 | 2/2020 |
| WO | 2020032675 | A1 | 2/2020 |
| WO | 2020050630 | A1 | 3/2020 |
| WO | 2020091346 | A1 | 5/2020 |
| WO | 2020096095 | A1 | 5/2020 |

OTHER PUBLICATIONS

Huawei., et al., "BWP Operation in NR Unlicensed Band", 3GPP TSG RAN WG1 Meeting #94, R1-1808065, Gothenburg, Sweden, Aug. 20-Aug. 24, 2018, 4 Pages, Aug. 11, 2018.

Huawei., et al., "NR Numerology and Frame Structure for Unlicensed Bands", 3GPP TSG RAN WG1 Meeting #95, R1-1812191, Spokane, USA, Nov. 12-Nov. 16, 2018, 13 Pages, Nov. 3, 2018.

Co-pending U.S. Appl. No. 17/997,481, inventor Wu; Shuanshuan, filed Oct. 28, 2022.

ZTE: "Discussion on configured grant for NR-U", 3GPP TSG RAN WG1 Meeting #94bis, R1-1810329, Chengdu, China, Oct. 8-12, 2018, pp. 1-5.

* cited by examiner

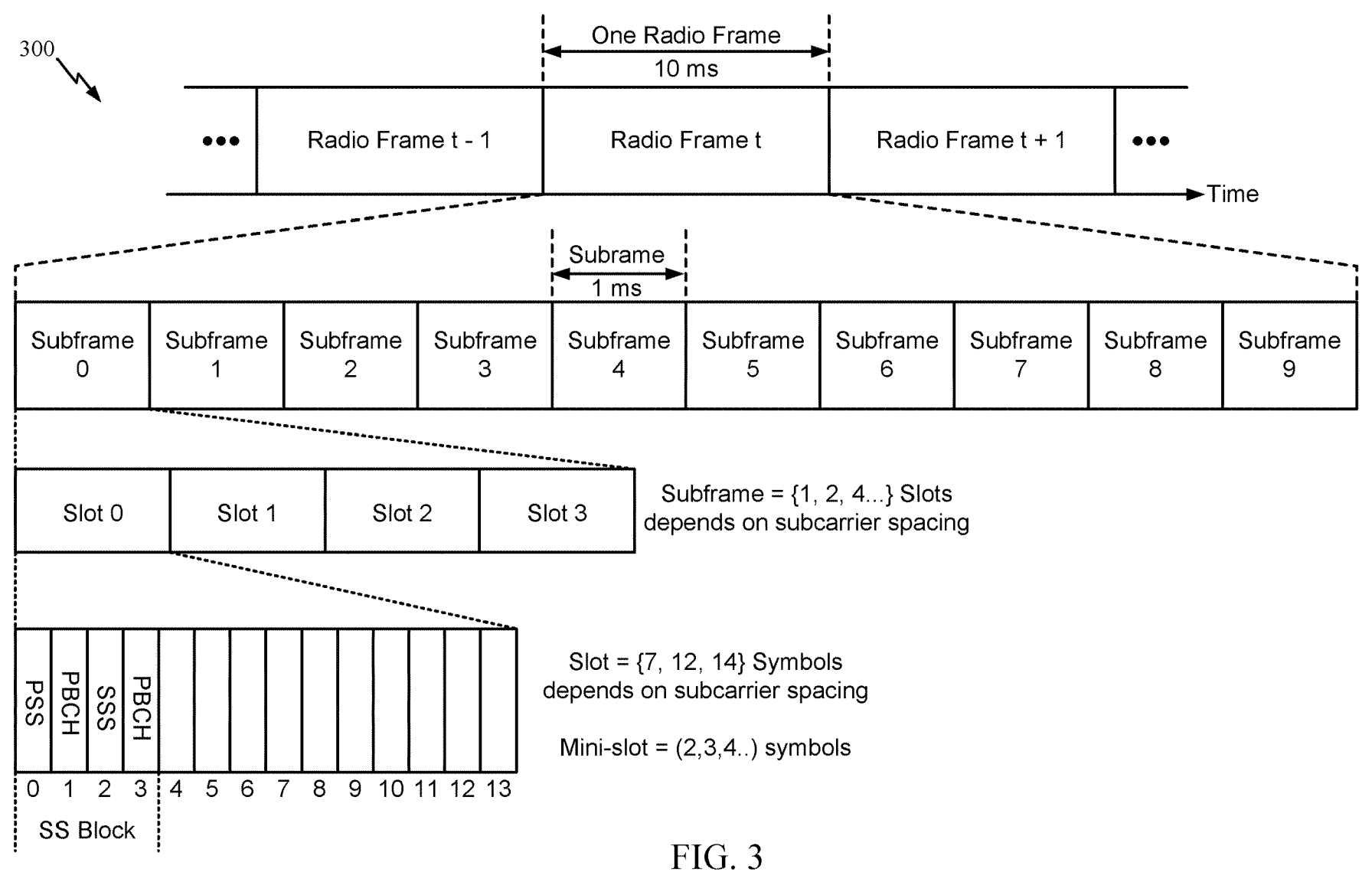

Subframe = {1, 2, 4...} Slots depends on subcarrier spacing

Slot = {7, 12, 14} Symbols depends on subcarrier spacing

Mini-slot = (2,3,4...) symbols

FIG. 3

1600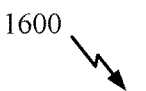

1602

RECEIVE ONE OR MORE TRANSMISSIONS INDICATING THAT A DEVICE HAS ACQUIRED A FREQUENCY BAND FOR A CHANNEL OCCUPANCY TIME (COT) FOR COMMUNICATION BY ONE OR MORE DEVICES INCLUDING THE FIRST UE, THE ONE OR MORE TRANSMISSIONS FURTHER INDICATING ONE OR MORE ALLOCATED SUBCHANNELS OF THE FREQUENCY BAND THAT ARE ALLOCATED TO AT LEAST ONE DEVICE OTHER THAN THE FIRST UE DURING A FIRST TIME PERIOD OF THE COT, THE FREQUENCY BAND COMPRISING THE ONE OR MORE ALLOCATED SUBCHANNELS AND ONE OR MORE UNALLOCATED SUBCHANNELS DURING THE FIRST TIME PERIOD

1604

MEASURE A SIGNAL STRENGTH OF ONLY THE ONE OR MORE UNALLOCATED SUBCHANNELS FOR AT LEAST A PORTION OF THE FIRST TIME PERIOD PRIOR TO A SECOND TIME PERIOD OF THE COT

1606

CALCULATE A THRESHOLD BASED ON A RATIO OF A FIRST BANDWIDTH OF THE ONE OR MORE UNALLOCATED SUBCHANNELS TO A SECOND BANDWIDTH OF THE FREQUENCY BAND

1608

CALCULATE A THRESHOLD BASED ON A RATIO OF A FIRST BANDWIDTH OF THE ONE OR MORE UNALLOCATED SUBCHANNELS EXCLUDING THE ONE OR MORE FREQUENCY SUBBANDS TO A SECOND BANDWIDTH OF THE FREQUENCY BAND

1610

WHEN THE MEASURED SIGNAL STRENGTH IS LESS THAN A THRESHOLD, TRANSMIT A SIGNAL WITHIN THE FREQUENCY BAND DURING THE SECOND TIME PERIOD

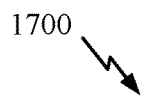

1702

RECEIVE ONE OR MORE TRANSMISSIONS INDICATING ONE OR MORE ALLOCATED SUBCHANNELS OF A FREQUENCY BAND THAT ARE ALLOCATED DURING A FIRST TIME PERIOD, THE FREQUENCY BAND COMPRISING THE ONE OR MORE ALLOCATED SUBCHANNELS AND ONE OR MORE UNALLOCATED SUBCHANNELS DURING THE FIRST TIME PERIOD

1704

SENSE THE ONE OR MORE UNALLOCATED SUBCHANNELS FOR AT LEAST A PORTION OF THE FIRST TIME PERIOD PRIOR TO A SECOND TIME PERIOD

1706

CALCULATE A THRESHOLD BASED ON A RATIO OF A FIRST BANDWIDTH OF THE ONE OR MORE UNALLOCATED SUBCHANNELS TO A SECOND BANDWIDTH OF THE FREQUENCY BAND

1708

CALCULATE A THRESHOLD BASED ON A RATIO OF A FIRST BANDWIDTH OF THE ONE OR MORE UNALLOCATED SUBCHANNELS EXCLUDING THE ONE OR MORE FREQUENCY SUBBANDS TO A SECOND BANDWIDTH OF THE FREQUENCY BAND

1710

TRANSMIT A SIGNAL WITHIN THE FREQUENCY BAND DURING THE SECOND TIME PERIOD BASED ON ENERGY SENSED FOR THE ONE OR MORE UNALLOCATED SUBCHANNELS BEING LESS THAN A THRESHOLD

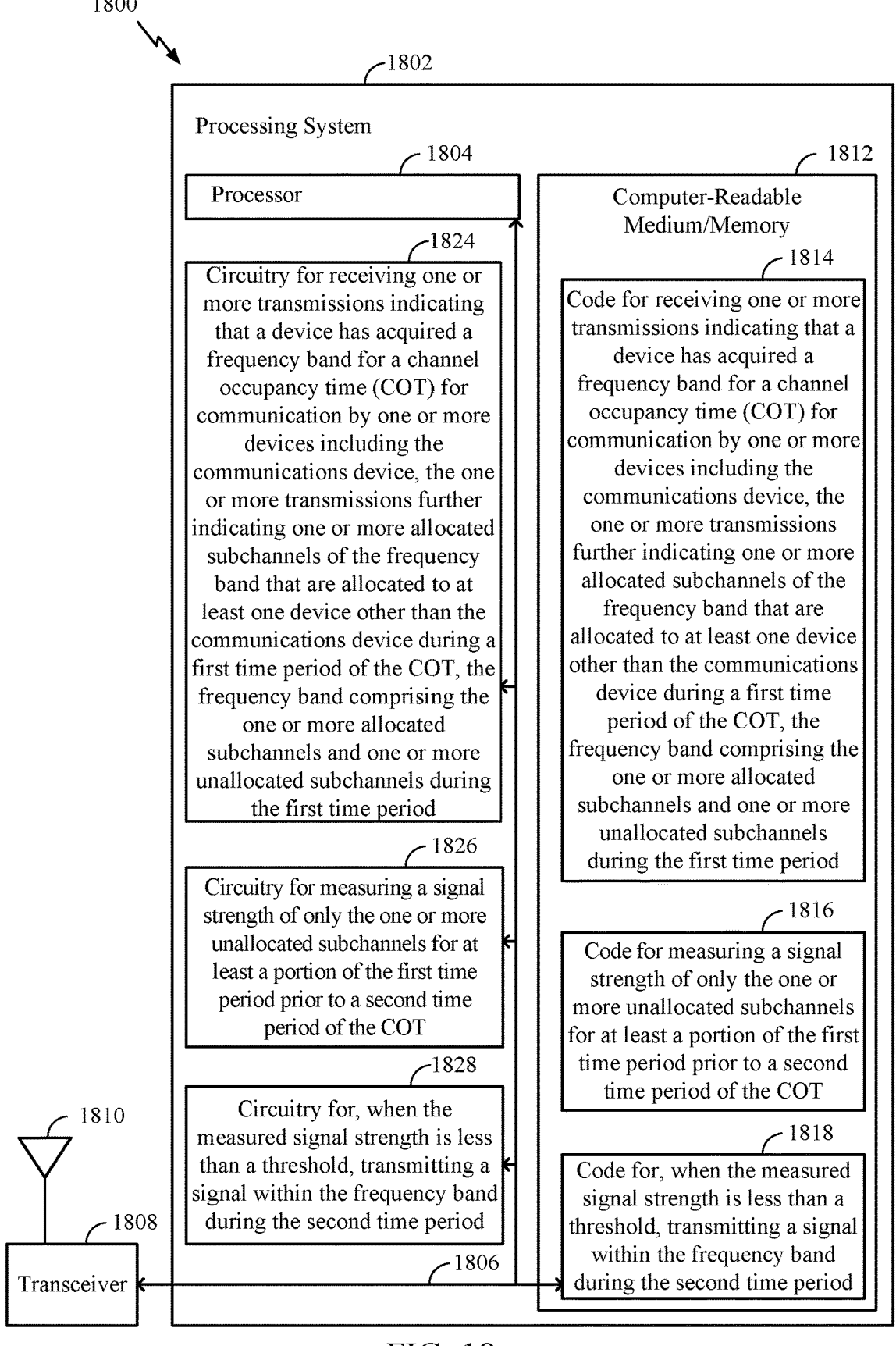

1802

Processing System

1804

Processor

1824

Circuitry for receiving one or more transmissions indicating that a device has acquired a frequency band for a channel occupancy time (COT) for communication by one or more devices including the communications device, the one or more transmissions further indicating one or more allocated subchannels of the frequency band that are allocated to at least one device other than the communications device during a first time period of the COT, the frequency band comprising the one or more allocated subchannels and one or more unallocated subchannels during the first time period

1826

Circuitry for measuring a signal strength of only the one or more unallocated subchannels for at least a portion of the first time period prior to a second time period of the COT

1828

Circuitry for, when the measured signal strength is less than a threshold, transmitting a signal within the frequency band during the second time period

1812

Computer-Readable Medium/Memory

1814

Code for receiving one or more transmissions indicating that a device has acquired a frequency band for a channel occupancy time (COT) for communication by one or more devices including the communications device, the one or more transmissions further indicating one or more allocated subchannels of the frequency band that are allocated to at least one device other than the communications device during a first time period of the COT, the frequency band comprising the one or more allocated subchannels and one or more unallocated subchannels during the first time period

1816

Code for measuring a signal strength of only the one or more unallocated subchannels for at least a portion of the first time period prior to a second time period of the COT

1818

Code for, when the measured signal strength is less than a threshold, transmitting a signal within the frequency band during the second time period

1810

1808

Transceiver

SUBCHANNEL-BASED LISTEN BEFORE TALK FOR UNLICENSED CHANNEL ACCESS

CROSS-REFERENCE TO RELATED APPLICATIONS

This application is a national stage application under 35 U.S.C. 371 of PCT/US2021/041804, filed Jul. 15, 2021, which claims benefit of and priority to Greece Provisional Application No. 20200100426, filed Jul. 20, 2020, which are hereby assigned to the assignee hereof and hereby expressly incorporated by reference herein in their entireties as if fully set forth below and for all applicable purposes.

INTRODUCTION

Aspects of the present disclosure relate to wireless communications, and more particularly, to techniques for unlicensed channel access.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly.

Certain aspects of the subject matter described in this disclosure can be implemented in a method for wireless communication by a user equipment (UE). The method generally includes receiving one or more transmissions indicating one or more allocated subchannels of a frequency band that are allocated during a first time period, the frequency band comprising the one or more allocated subchannels and one or more unallocated subchannels during the first time period; sensing the one or more unallocated subchannels for at least a portion of the first time period prior to a second time period; and based on energy sensed for the one or more unallocated subchannels being less than a threshold, transmitting a signal within the frequency band during the second time period.

Certain aspects of the subject matter described in this disclosure can be implemented in an apparatus for wireless communication. The apparatus generally includes a memory and a processor, which is coupled to the memory. The memory and the processor are configured to receive one or more transmissions indicating one or more allocated subchannels of a frequency band that are allocated during a first time period, the frequency band comprising the one or more allocated subchannels and one or more unallocated subchannels during the first time period. The processor and the memory are further configured to sense the one or more unallocated subchannels for at least a portion of the first time period prior to a second time period and transmit a signal within the frequency band during the second time period based on energy sensed for the one or more unallocated subchannels being less than a threshold.

Certain aspects of the subject matter described in this disclosure can be implemented in an apparatus for wireless communication. The apparatus generally includes means for receiving one or more transmissions indicating one or more allocated subchannels of a frequency band that are allocated during a first time period, the frequency band comprising the one or more allocated subchannels and one or more unallocated subchannels during the first time period; means for sensing the one or more unallocated subchannels for at least a portion of the first time period prior to a second time period; and means for transmitting a signal within the frequency band during the second time period based on energy sensed for the one or more unallocated subchannels being less than a threshold.

Certain aspects of the subject matter described in this disclosure can be implemented in a computer-readable storage medium. The computer-readable storage medium includes instructions that, when executed by a processing system of an apparatus, cause the processing system to perform operations generally including receiving one or more transmissions indicating one or more allocated subchannels of a frequency band that are allocated during a first time period, the frequency band comprising the one or more allocated subchannels and one or more unallocated subchannels during the first time period; sensing the one or more unallocated subchannels for at least a portion of the first time period prior to a second time period; and based on energy sensed for the one or more unallocated subchannels being less than a threshold, transmitting a signal within the frequency band during the second time period.

Certain aspects of the subject matter described in this disclosure can be implemented in a method for wireless communication by a first user equipment (UE). The method generally includes receiving one or more transmissions indicating that a device has acquired a frequency band for a channel occupancy time (COT) for communication by one or more devices including the first UE, the one or more transmissions further indicating one or more allocated subchannels of the frequency band that are allocated to at least one device other than the first UE during a first time period of the COT, the frequency band comprising the one or more allocated subchannels and one or more unallocated subchannels during the first time period; measuring a signal strength of only the one or more unallocated subchannels for at least a portion of the first time period prior to a second time period of the COT; and when the measured signal strength is less than a threshold, transmitting a signal within the frequency band during the second time period.

Certain aspects of the subject matter described in this disclosure can be implemented in an apparatus for wireless communication. The apparatus generally includes means for receiving one or more transmissions indicating that a device has acquired a frequency band for a channel occupancy time (COT) for communication by one or more devices including the apparatus, the one or more transmissions further indicating one or more allocated subchannels of the frequency band that are allocated to at least one device other than the apparatus during a first time period of the COT, the frequency band comprising the one or more allocated subchannels and one or more unallocated subchannels during the first time period; means for measuring a signal strength of only the one or more unallocated subchannels for at least a portion of the first time period prior to a second time period of the COT; and means for, when the measured signal strength is less than a threshold, transmitting a signal within the frequency band during the second time period.

Certain aspects of the subject matter described in this disclosure can be implemented in an apparatus for wireless communication. The apparatus generally includes a memory; and a processor coupled to the memory, the memory and the processor configured to: receive one or more transmissions indicating that a device has acquired a frequency band for a channel occupancy time (COT) for communication by one or more devices including the apparatus, the one or more transmissions further indicating one or more allocated subchannels of the frequency band that are allocated to at least one device other than the apparatus during a first time period of the COT, the frequency band comprising the one or more allocated subchannels and one or more unallocated subchannels during the first time period; measure a signal strength of only the one or more unallocated subchannels for at least a portion of the first time period prior to a second time period of the COT; and when the measured signal strength is less than a threshold, transmitting a signal within the frequency band during the second time period.

Certain aspects of the subject matter described in this disclosure can be implemented in a computer-readable storage medium. The computer-readable storage medium includes instructions that, when executed by a processing system of a first UE, cause the processing system to perform operations generally including: receiving one or more transmissions indicating that a device has acquired a frequency band for a channel occupancy time (COT) for communication by one or more devices including the first UE, the one or more transmissions further indicating one or more allocated subchannels of the frequency band that are allocated to at least one device other than the first UE during a first time period of the COT, the frequency band comprising the one or more allocated subchannels and one or more unallocated subchannels during the first time period; measuring a signal strength of only the one or more unallocated subchannels for at least a portion of the first time period prior to a second time period of the COT; and when the measured signal strength is less than a threshold, transmitting a signal within the frequency band during the second time period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is an example frame format for certain wireless communication systems (e.g., new radio (NR)), in accordance with certain aspects of the present disclosure.

FIG. 16 is a flow diagram illustrating example operations for wireless communication by a UE, in accordance with certain aspects of the present disclosure.

FIG. 17 is a flow diagram illustrating example operations for wireless communication by a UE, in accordance with certain aspects of the present disclosure.

FIG. 18 illustrates a communications device that may include various components configured to perform operations for the techniques disclosed herein, in accordance with aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
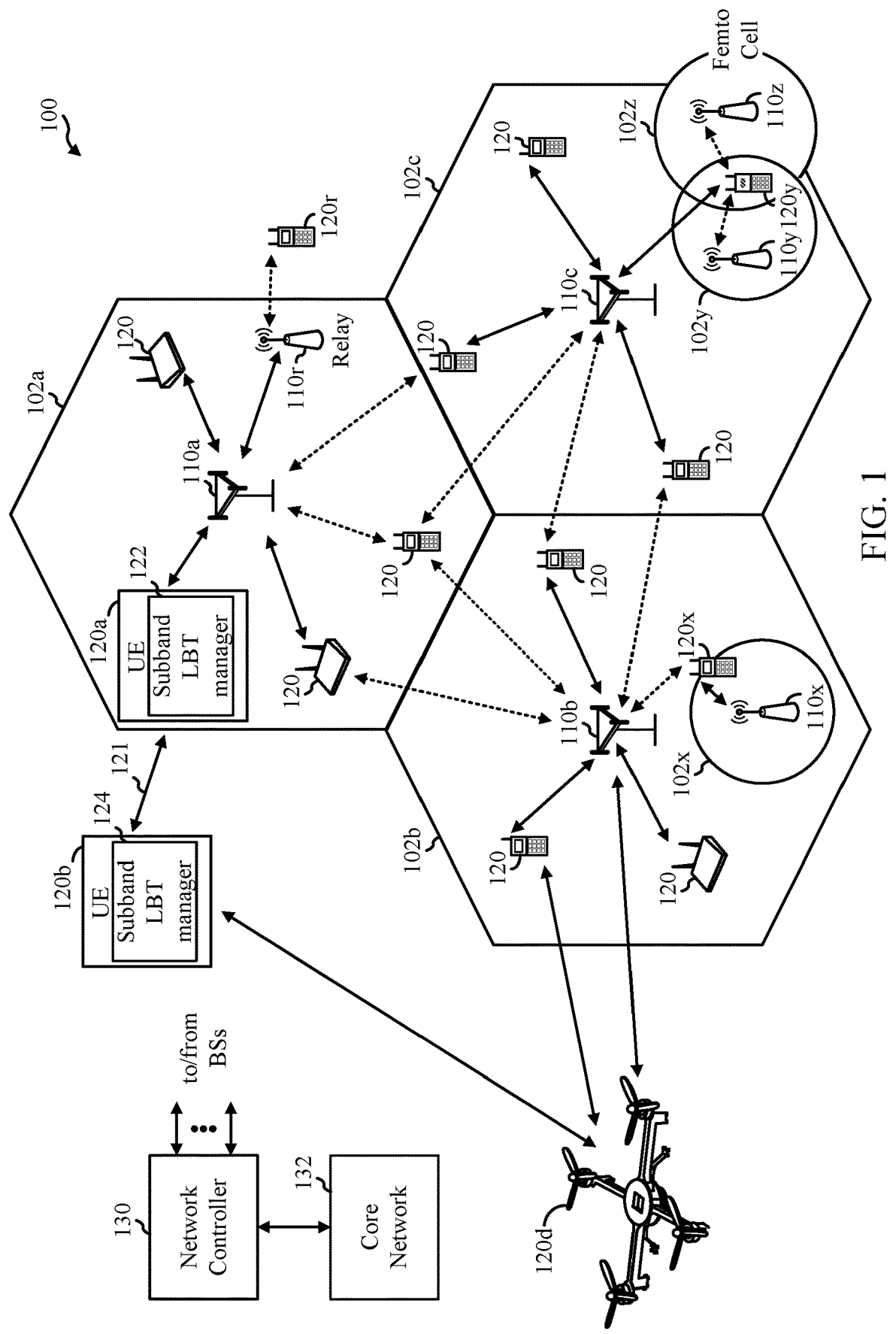
FIG. 1 is a block diagram conceptually illustrating an example wireless communication network, in accordance with certain aspects of the present disclosure.

Aspects of the present disclosure provide apparatus, methods, processing systems, and computer readable mediums for a device to perform subchannel based listen before talk (LBT) procedures in order to transmit signals using subchannels of unlicensed spectrum. In certain aspects the signals may be sidelink signals, such as for cellular vehicle to everything (CV2X) communications. Though certain aspects are described with respect to sidelink communications, such as CV2X communications, in unlicensed spectrum, it should be understood that the techniques described herein may be used for other suitable communications.

In certain aspects, for wireless communications in unlicensed spectrum, a wireless communication device (e.g., UE, Wi-Fi device, and/or the like) may perform a channel access procedure referred to as a listen-before-talk (LBT) procedure, where the device may transmit if the channel, corresponding to a frequency band, is sensed to be free (e.g., idle) prior to transmitting. The time period prior to transmitting, during which the LBT procedure is performed, may be referred to as a sensing occasion. In certain aspects, in an LBT procedure, a wireless communication device senses (e.g., measures) energy on the frequency band and refrains from transmitting on the frequency band should the frequency band be busy, and determines it may communicate on the frequency band should the frequency band be idle. As used herein, the term "idle" for a frequency band means that energy as sensed on the frequency band by a device determining idleness is below a threshold level. As used herein, the term "busy" for a frequency band means that energy as sensed on the frequency band by the device determining idleness is above the threshold level. Such energy may be due to noise or signals within the frequency band.

In certain aspects, wireless communication devices have the capability to share a frequency band for transmission, such as an unlicensed frequency band. For example, a frequency band may be divided in frequency into a number of subchannels. Further, the wireless communication devices may use frequency division multiplexing (FDM) whereby each device uses a different one or more subchannels of the number of subchannels to transmit, such that the transmission by one device do not interfere with the transmissions by another device.

However, in certain aspects, if a wireless communication device performs an LBT procedure and senses over an entire frequency band, it is possible that energy sensed from a transmission by another device in a first subchannel of the frequency band, causes the wireless communication device to determine that the frequency band is busy. Thus, the wireless communication device may refrain from transmitting in any subchannel of the frequency band, even if the wireless communication device could transmit in a second subchannel of the frequency band that is different than the first subchannel without causing interference. In other words, transmission by the wireless communication device is "blocked" due to sensing of the transmission by the other device.

Accordingly, in certain aspects, a wireless communication device (e.g., a CV2X device) may perform an LBT procedure and determine whether to transmit based on the energy measured by the device over not the entire frequency band, but rather the energy measured on only one or more resources (e.g., one or more time frequency resources, one or more subchannels, etc.) unallocated for other (e.g., CV2X) devices. In certain aspects, the device may sense the energy on only resources unallocated for other devices. In certain aspects, the device may sense the energy over the entire frequency band, but use only the energy measured on resources unallocated for other devices to determine whether to transmit.

For example, in certain aspects, an acquiring device (e.g., CV2X device) may acquire (e.g., reserve, obtain, retain, etc.) use of a frequency band, such as an unlicensed frequency band, for a time period (e.g., referred to as a channel occupancy time (COT)) by performing an LBT procedure and sensing energy over the entire frequency band. For example, in certain aspects of the present disclosure, a COT may designate an interval of time that one or more devices can transmit via a frequency band continuously before yielding the frequency band (e.g., stopping transmitting via the frequency band for a period long enough for other devices to begin transmitting via the same frequency band).

According to certain aspects, a device (e.g., a CV2X device) may utilize a currently active COT, initiated by another device (e.g., a CV2X device), by performing an LBT procedure that ignores channel activity due to CV2X signals (e.g., CV2X signals by the COT-initiating device or other CV2X devices sharing the COT).

In certain aspects, each of the one or more devices may share the frequency band during the COT using FDM and by performing LBT by determining whether to transmit within the COT based on the energy measured by the device over not the entire frequency band, but rather the energy measured on only one or more resources (e.g., one or more time-frequency resources, one or more subchannels, etc.) unallocated for transmission by other devices during the COT. In certain aspects, a device (e.g., a CV2X device) that is given information about which subchannels are utilized and during what time periods (e.g., slots) by one or more other CV2X device(s) over a currently active COT and has data to transmit in the same COT during one or more time periods may perform an LBT only over subchannels that are not used (e.g., transmitted on) by the other CV2X device(s) during the one or more time periods the device has data to transmit. By performing an LBT only over subchannels not used by the other CV2X device(s), the device may avoid sensing energy originating from the other CV2X devices and declaring that energy as channel activity.

As described in more detail below, in certain aspects, COT sharing may be: (i) time-division multiplexing (TDM) style COT sharing, where a COT is shared by time multiplexing CV2X signal transmissions (e.g., CV2X devices transmit signaling, one at a time over a frequency band to which the COT applies, using contiguous time resources until the COT duration is exhausted), and/or (ii) frequency-division multiplexing (FDM) style COT sharing, where a COT is shared by frequency multiplexing (e.g., CV2X devices transmit simultaneously on different subchannels of a frequency band to which the COT applies).

For example, a CV2X device that performs an LBT procedure, determines the frequency band is idle, and therefore acquires use of the frequency band for the COT, may share use of the frequency band for the COT (also referred to as sharing the COT) with one or more additional CV2X devices. In certain aspects, in order for these CV2X devices to share the COT, a signal (e.g., a data signal carrying data referred to as a data signal, a reservation signal not carrying data and used just for reserving the frequency band, etc.) may need to be continuously transmitted without a gap in time by the CV2X devices over one or more subchannels of the frequency band. Accordingly, at any given time during the COT, at least one of the CV2X devices sharing the frequency band for the COT may be transmitting a signal in at least one subchannel of the frequency band. Any non-CV2X devices that may perform an LBT during the COT may find the frequency band as busy, and thus refrain from transmitting on the frequency band.

In certain aspects, the acquiring device allocates resources of the frequency band during the COT to one or more additional devices that share in the COT. For example, the acquiring device allocates, for each of one or more time periods within the COT, one or more different subchannels to one or more different additional devices for use by the one or more additional devices to transmit data, signal, control information, etc. The acquiring device may transmit control information to the one or more additional devices informing the one or more additional devices of the allocation of resources of the frequency band during the COT.

In certain aspects, prior to transmitting in the frequency band during the COT, a device may perform an LBT procedure and determine whether to transmit based on the energy measured by the device over not the entire frequency band, but rather the energy measured on only one or more subchannels of the frequency band unallocated for other devices during the COT.

Certain aspects of the present disclosure provide for a user equipment (e.g., operating as a CV2X device) to transmit a signal in a subchannel of a (e.g., unlicensed) frequency band (e.g., an unlicensed channel) during at least a portion of a channel occupancy time (COT) for the frequency band acquired by another UE, based on a listen before talk (LBT) procedure performed on the unused subchannel(s) (e.g., excluding subchannel(s) on which the other UE is transmitting) for the portion of the COT. That is, a UE can share a COT, acquired by another UE, to transmit on a subchannel for a time period corresponding to at least a portion of the COT. The UE shares the COT by measuring, prior to the time period, a received signal strength (e.g., received signal strength indicator (RSSI) or reference signal received power (RSRP)) of one or more subchannels not allocated to other UEs (e.g., for the other UEs to transmit on) and transmitting on the measured subchannel(s) when the received signal strength is less than or equal to a threshold.

Performance of the LBT procedure by a device sharing in the COT may help reduce interference to other devices, such as non-CV2X devices. For example, in a first illustrative example, a first CV2X device (e.g., a UE) may share a COT, acquired by a second CV2X device, by transmitting a signal in an unoccupied subchannel (e.g., a subband) of the corresponding frequency band during a first time period of the COT without performing an LBT prior to the first time period. At the same time, a third device (e.g., a non-CV2X device, such as a Wi-Fi device) may be close enough to the first CV2X device that the transmissions from the first CV2X device would interfere with communication by the third device. Further, the third device may not sense transmissions reserving the frequency band by the second CV2X device prior to the first time period, as discussed, such as based on the second CV2X device being far from the third device. Thus, the third device may determine the entire frequency band is idle prior to the first time period, and also transmit during the first time period. Accordingly, the third device may be in transmit mode at the same time the first CV2X device transmits during the COT, causing interference, such as if the third device also transmits in the unoccupied subchannel.

As discussed, in one or more aspects, prior to transmitting in the frequency band during the COT, a CV2X device may perform an LBT procedure and determine whether to transmit based on the energy measured by the device over not the entire frequency band, but rather the energy measured on only one or more subchannels of the frequency band unallocated for other devices during the COT. The CV2X device may then determine if another device, such as a non-CV2X device like the third device, is occupying the frequency band during the COT. Thus, if the CV2X device determines that another device is occupying the frequency band during the COT, the CV2X device can avoid causing interference with the other device by refraining from transmitting. Further, the CV2X device can still share the COT by avoiding sensing transmissions of other CV2X devices on allocated subchannels as indicating the entire frequency band is busy, such that the CV2X can still determine the frequency band is idle for transmission on one or more unallocated subchannels of the frequency band. Accordingly, techniques discussed herein may reduce latency for the CV2X device to communicate and increase throughput by allowing the CV2X device to transmit without allocated subchannels (e.g., used by other CV2X devices sharing the COT) blocking transmissions. Further, such techniques reduce interference by abiding by LBT procedures on the unlicensed spectrum.

In some aspects of the present disclosure, the device (e.g., the first CV2X device described above) can determine a threshold for the measurement (e.g., the measurement of signal strength in the LBT) in order to determine whether the channel is busy or idle with respect to non-CV2X transmissions. In some aspects of the present disclosure, techniques for the device to adjust the threshold, based on the number or size in bandwidth of the measured subchannels, are described. In one example, a device (e.g., the first CV2X device described above) may measure signal strength of only subchannels not used by another CV2X device as part of an LBT, and the device (e.g., the first CV2X device) may determine a signal strength threshold for the LBT, based on the number or size in bandwidth of the subchannels measured in the LBT.

In some aspects of the present disclosure, CV2X transmissions, as measured by a receiver, from a relatively near transmitter have more subchannel energy leakage than transmissions from a relatively far transmitter (also referred to as a near-far transmission issue), and the effect of the near-far transmission issue on subchannel LBT measurements (e.g., LBT measurements by the receiver) is described. In some aspects of the present disclosure, techniques for mitigating the described near-far transmission issue for accurate LBT measurements are described. Techniques for adjusting a threshold used in an LBT as part of mitigating the described near-far transmission issue are also described.

Certain aspects of the present disclosure may improve the frequency division multiplexing capabilities of CV2X devices by enabling the CV2X devices to respect LBT coexistence rules in unlicensed spectrum while using the frequency division multiplexing capabilities of CV2X, which may benefit both CV2X and non-CV2X transmissions. In certain aspects, non-CV2X transmissions can benefit from the frequency division multiplexing of CV2X transmissions because the multiplexing of CV2X transmissions may result in a smaller effective channel occupancy time for the CV2X transmissions, and, therefore, more time being available for the non-CV2X transmissions. This can increase throughput and reduce latency.

According to certain aspects of the present disclosure, a first UE may receive one or more transmissions indicating that a device has acquired a frequency band for a channel occupancy time (COT) for communication by one or more devices including the first UE, the one or more transmissions further indicating one or more allocated subchannels of the frequency band that are allocated to at least one device other than the first UE during a first time period of the COT, the frequency band comprising the one or more allocated subchannels and one or more unallocated subchannels during the first time period; measure a signal strength of only the one or more unallocated subchannels for at least a portion of the first time period prior to a second time period of the COT; and when the measured signal strength is less than a threshold, transmit a signal within the frequency band during the second time period. In certain aspects, a first UE operating according to certain aspects herein that receives signaling weakly (e.g., due to path loss) from a second UE may be prevented from sharing a COT acquired by the second UE, thus preventing the first UE from unfairly occupying (e.g., unlicensed) frequency band(s) without performing LBT, and, potentially, introducing interference to non-CV2X transmissions occurring in the vicinity of the first UE.

Such techniques may be used, for example, in sidelink communications between wireless communication devices. In other examples, the wireless communication devices may include cellular vehicle-to-everything (CV2X) devices. It should be noted that though certain aspects are described with respect to CV2X devices, UEs, and communication in the unlicensed band, it can be appreciated that the aspects may similarly be applicable to other scenarios, such as any communications (e.g., sidelink communications) in an unlicensed band, communications (e.g., sidelink communications) in a licensed band, between other devices, etc.

An unlicensed spectrum (also commonly referred to as "shared spectrum") refers to any frequency band(s) that are not subject to licensed use under regulatory practice, such that the frequency band(s) are open to use by any devices, and not just devices that have a license to use the particular frequency band(s). Example sidelink communications include vehicle-to-everything (V2X) communications. Though certain aspects may be discussed with respect to V2X communications in a V2X communications system, it should be noted that the aspects may equally apply to other suitable types of sidelink communications systems.

The following description provides examples of a UE performing subchannel based listen before talk (LBT) procedures in order to transmit cellular vehicle to everything (CV2X) signals using subchannels of unlicensed spectrum. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The electromagnetic spectrum, such as in a licensed band, is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., e.g., 24 GHz to 53 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

According to certain aspects, the UEs 120 may be configured for a UE to transmit a signal in a (e.g., unlicensed) frequency band (e.g., an unlicensed channel) during a COT for the frequency band acquired by another UE. As shown in FIG. 1, the UE 120a includes a subband LBT manager 112 that receives one or more transmissions 121 indicating that a device (e.g., UE 120b) has acquired a frequency band for a channel occupancy time (COT) for communication by one or more devices including the UE, the one or more transmissions further indicating one or more allocated subchannels of the frequency band that are allocated to at least one device other than the UE during a first time period of the COT, the frequency band comprising the one or more allocated subchannels and one or more unallocated subchannels during the first time period; measures a signal strength of only the one or more unallocated subchannels for at least a portion of the first time period prior to a second time period of the COT; and when the measured signal strength is less than a threshold, transmits a signal within the frequency band during the second time period, in accordance with aspects of the present disclosure. The UE 120b also includes a subband LBT manager 124 that receives one or more transmissions 121 indicating that a device (e.g., UE 120a) has acquired a frequency band for a channel occupancy time (COT) for communication by one or more devices including the UE, the one or more transmissions further indicating one or more allocated subchannels of the frequency band that are allocated to at least one device other than the UE during a first time period of the COT, the frequency band comprising the one or more allocated subchannels and one or more unallocated subchannels during the first time period; measures a signal strength of only the one or more unallocated subchannels for at least a portion of the first time period prior to a second time period of the COT; and when the measured signal strength is less than a threshold, transmitting a signal within the frequency band during the second time period, in accordance with aspects of the present disclosure.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. In one example, a quadcopter, drone, or any other unmanned aerial vehicle (UAV) or remotely piloted aerial system (RPAS) 120d may be configured to function as a UE. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
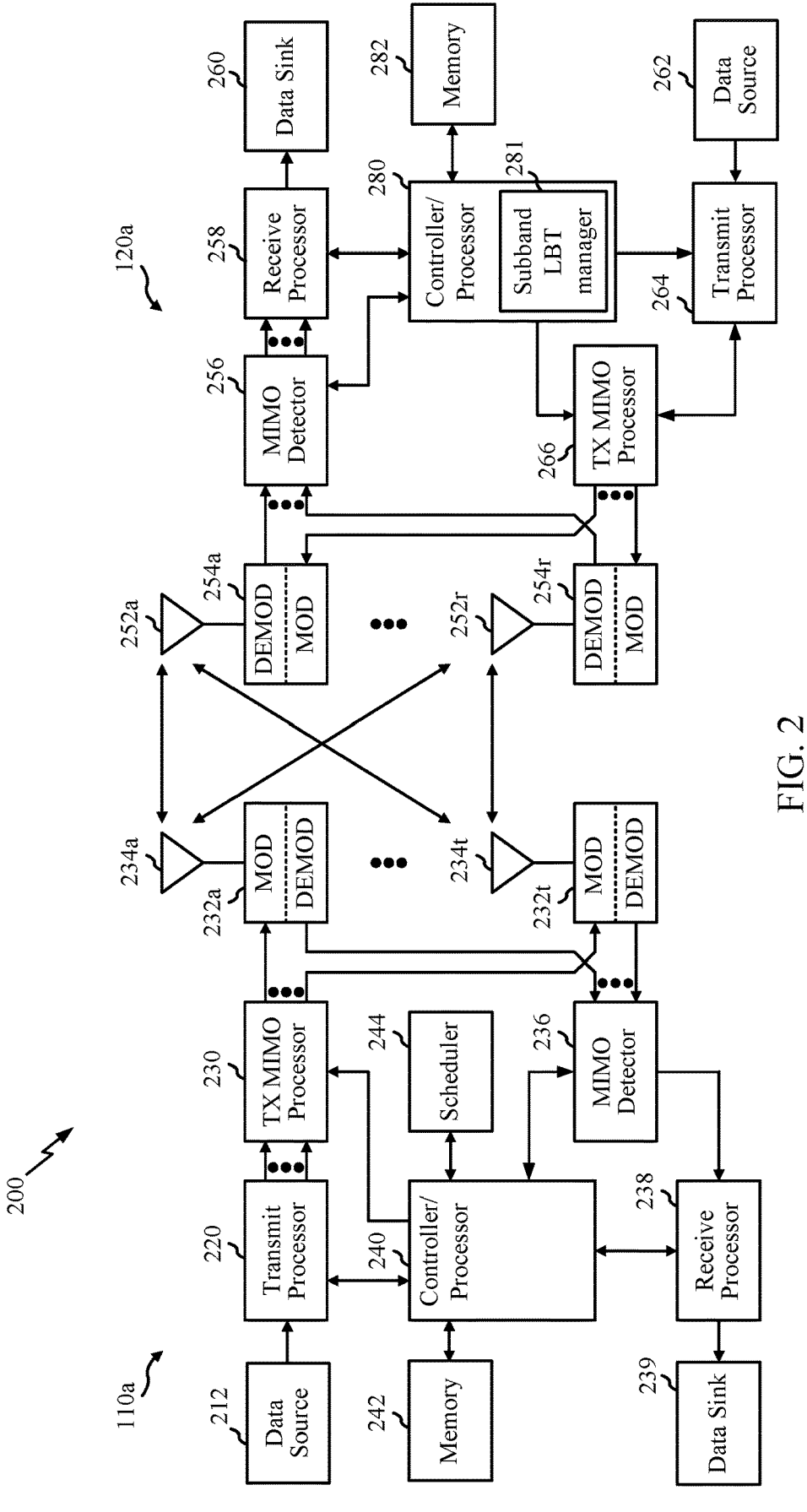
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 280 of the UE 120a has a subband LBT manager 281 that receives one or more transmissions indicating that a device has acquired a frequency band for a channel occupancy time (COT) for communication by one or more devices including the UE, the one or more transmissions further indicating one or more allocated subchannels of the frequency band that are allocated to at least one device other than the UE during a first time period of the COT, the frequency band comprising the one or more allocated subchannels and one or more unallocated subchannels during the first time period; measures a signal strength of only the one or more unallocated subchannels for at least a portion of the first time period prior to a second time period of the COT; and when the measured signal strength is less than a threshold, transmitting a signal within the frequency band during the second time period, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing; the SS may provide the CP length and frame timing. The PSS and SSS may provide the cell identity. The PBCH carries some basic system information, such as downlink system bandwidth, timing information within a radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple trans-missions of the SSB are referred to as a SS burst set. SSBs in an SS burst set may be transmitted in the same frequency region, while SSBs in different SS bursts sets can be transmitted at different frequency regions.

Figure 4B:
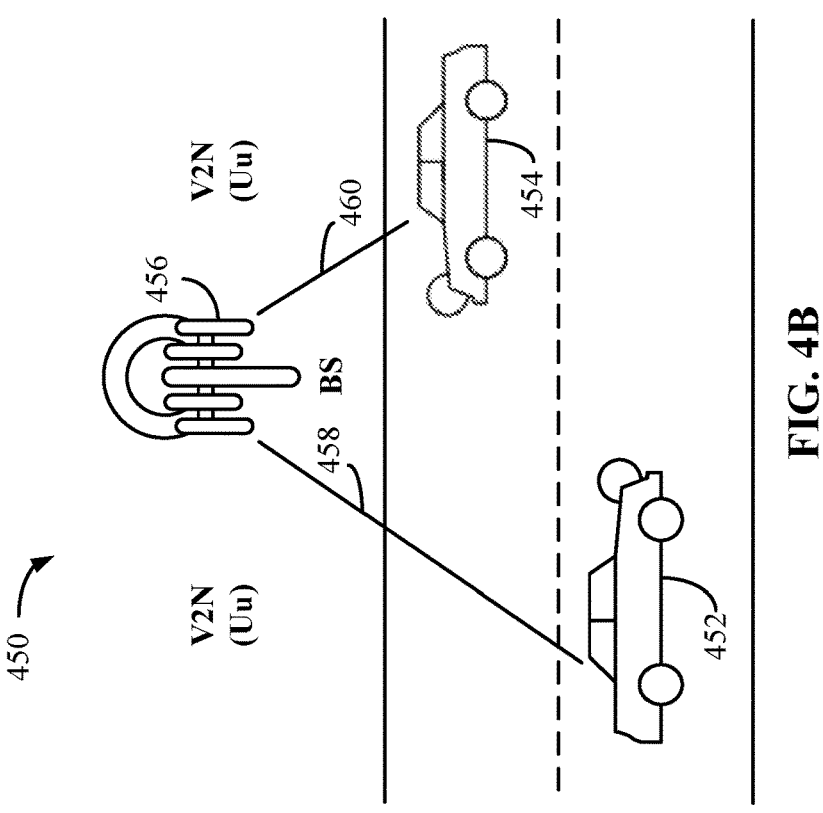
FIG. 4A and FIG. 4B show diagrammatic representations of example vehicle to everything (V2X) systems, in accordance with certain aspects of the present disclosure.
Figure 4A:
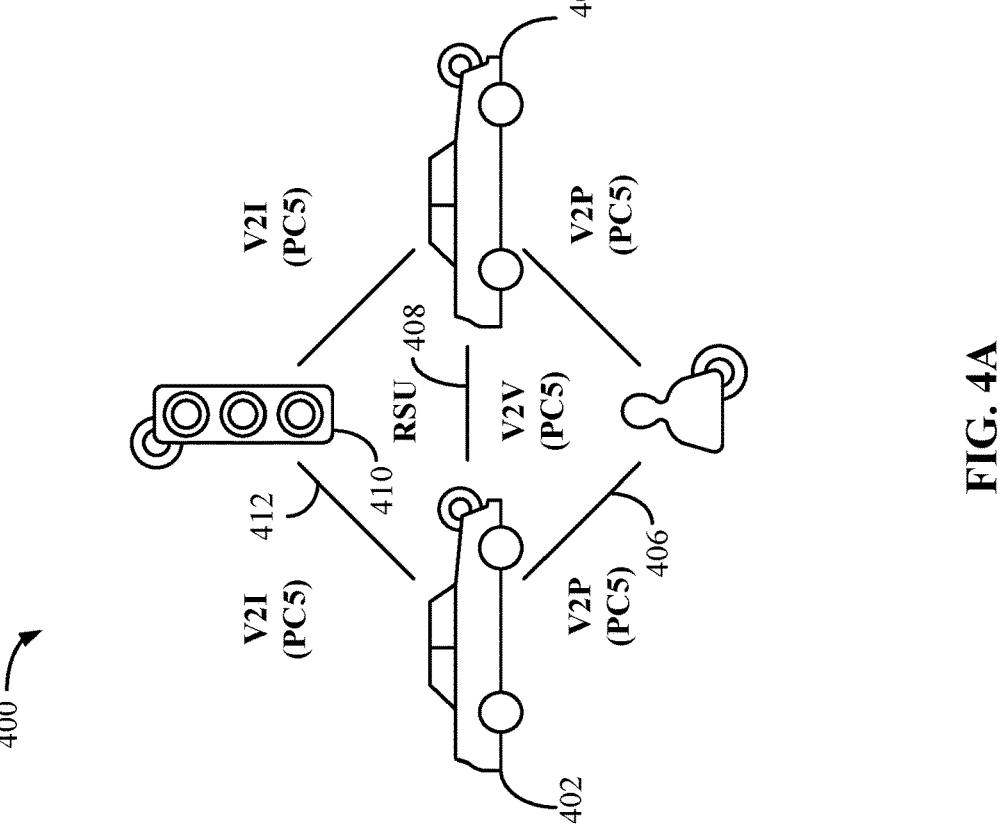

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be imple-mented over a Uu interface (for example, a wireless com-munication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, highway compo-nent 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share infor-mation. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 110a), that sends and receives information to and from (for example, relays information between) vehicles 452, 454. The network communications through vehicle to network (V2N) links 458 and 460 may be used, for example, for long-range communications between vehicles, such as for communi-cating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

Roadside units (RSUs) may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QoS) requirements by minimizing collisions and improving reli-ability. UE-type RSUs may use centralized resource alloca-tion mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Figure 5:
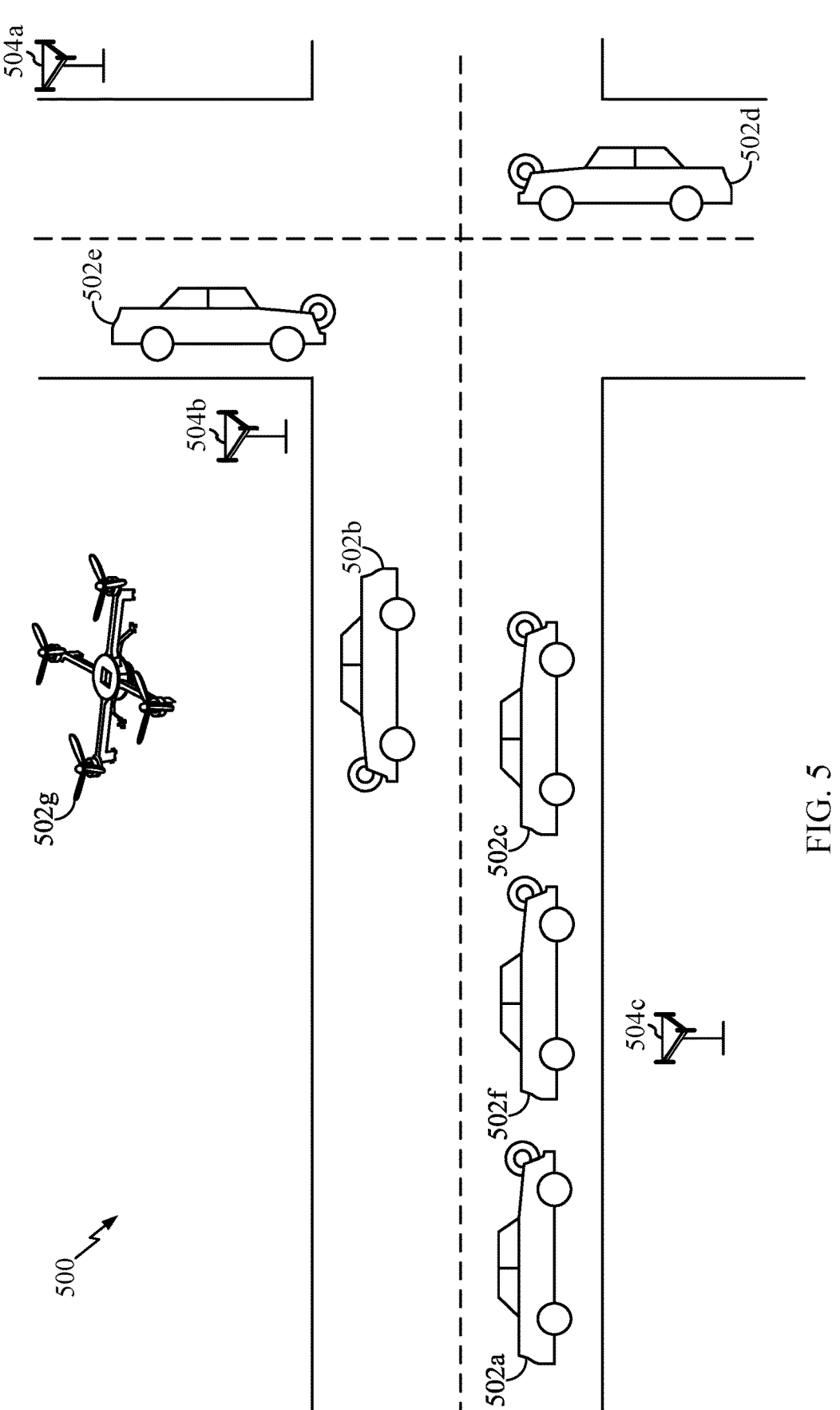
FIG. 5 is a schematic diagram illustrating an example network of multiple cellular V2X (CV2X) devices operating in an unlicensed spectrum.

FIG. 5 is a schematic diagram illustrating an example network 500 of multiple CV2X devices operating in an unlicensed spectrum. The unlicensed spectrum may be an example of a sidelink frequency band. Further, the network 500 may be an example of a sidelink communication system. The CV2X devices 502 may be configured to communicate on sidelink frequency channels as discussed herein. For example, any of the CV2X devices 502 may communicate with any other of the CV2X devices 502.

In the illustrated example, seven CV2X devices (e.g., a first CV2X device 502a, a second CV2X device 502b, a third CV2X device 502c, a fourth CV2X device 502d, a fifth CV2X device 502e, a sixth CV2X device 502f, and a seventh CV2X device 502g)— collectively referred to as CV2X devices 502) may operate in an unlicensed spectrum with other non-CV2X devices (e.g., non-CV2X devices 504a-c—collectively referred to as non-CV2X devices 504). In some examples, the first CV2X device 502a, the sixth CV2X device 502f, and the third CV2X device 502c may be part of a fleet or platoon. In transportation, platooning or flocking is a method for driving a group of vehicles together. It is meant to increase the capacity of roads via an automated highway system. Platoons decrease the distances between cars or trucks, such as based on SL communications.

Although the example provided is illustrative of six automotive CV2X devices in a traffic setting and a drone or other aerial vehicle CV2X device, it can be appreciated that CV2X devices and environments may extend beyond these, and include other wireless communication devices and envi-ronments. For example, the CV2X devices 502 may include UEs (e.g., UE 120 of FIG. 1) and/or road-side units (RSUs) operated by a highway authority, and may be devices implemented on motorcycles or carried by users (e.g., pedes-trian, bicyclist, etc.), or may be implemented on another aerial vehicle such as a helicopter.

The CV2X devices 502 may include UEs (e.g., UE 120 of FIG. 1), and may be devices implemented on motorcycles or carried by users (e.g., pedestrian, bicyclist, etc.), or implemented as a roadside unit.

Figure 6:
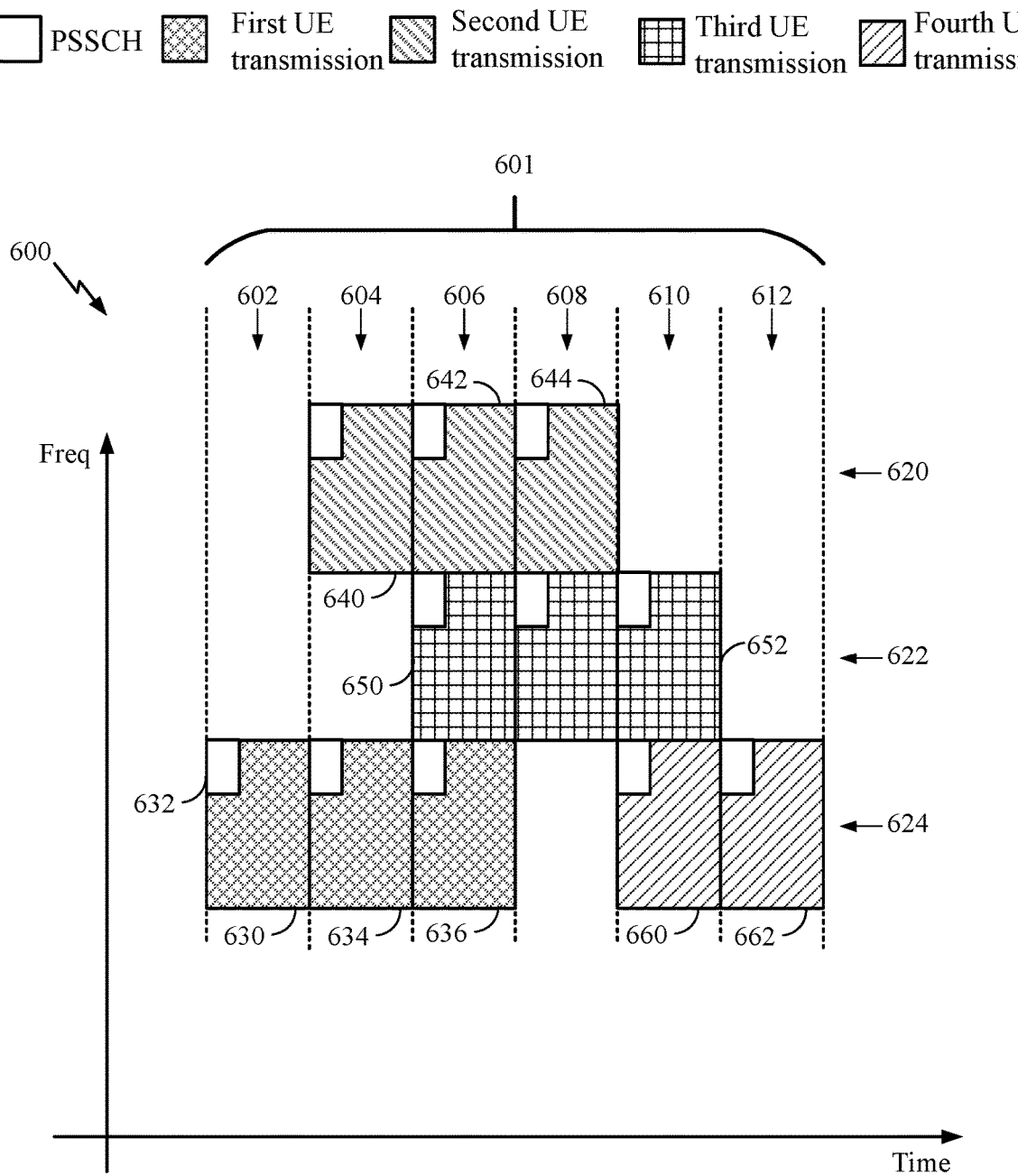
FIG. 6 is an exemplary transmission timeline illustrating time division multiplex (TDM) channel occupancy time (COT) sharing and frequency division multiplexing (FDM) COT sharing, in accordance with certain aspects of the present disclosure.

FIG. 6 is an example transmission timeline 600 illustrating TDM COT sharing and FDM COT sharing between CV2X devices, in accordance with aspects of the present disclosure. It should be noted that four CV2X devices are discussed for ease of explanation, and that that any suitable number of CV2X devices may perform COT sharing. In the example transmission timeline, a first UE (e.g., UE 120*a*, shown in FIG. 1, which may be a CV2X device) acquires a COT 601 including the symbols 602, 604, 606, 608, 610, and 612 on the subchannels 620, 622, and 624 of an unlicensed frequency band. The first UE sends a transmission 630 on subchannel 624 during symbol 602, the transmission 630 including control information 632. The control information may be sent in a physical sidelink control channel (PSCCH), for example. The first UE also sends transmissions 634 and 636 on subchannel 624 during symbols 604 and 606, respectively. Though the COT 601 is shown as including 6 symbols, it should be understood that the COT 601 may include any suitable number of symbols or other types of time periods. Though the unlicensed frequency band is shown as including three subchannels, it should be understood that the unlicensed frequency band may include any suitable number of subchannels.

In the example transmission timeline, a second UE (e.g., UE 120*b*, shown in FIG. 1) determines (e.g., based on decoding the control channel 632) that the second UE can send a transmission 640 on subchannel 620 during symbol 604 without performing LBT; that is, the second UE determines that the second UE can share the COT acquired by the first UE. By sending the transmission 640 on a different subchannel 620 during symbol 604 while the first UE is sending transmission 634 on subchannel 624 during symbol 604, the second UE is performing FDM COT sharing, or sharing the COT in an FDM manner. The second UE also sends transmissions 642 and 644 on subchannel 620 during symbols 606 and 608, respectively.

In the example transmission timeline, a third UE (e.g., UE 120*r*, shown in FIG. 1) determines (e.g., based on decoding the control channel 632) that the third UE can send a transmission 650 on subchannel 622 during symbol 606 without performing LBT; that is, the third UE determines that the third UE can share the COT acquired by the first UE. By sending the transmission 650 on subchannel 622 during symbol 606 while the first UE is sending transmission 636 on subchannel 624 and the second UE is sending transmission 642 on subchannel 620, the third UE is performing FDM COT sharing, or sharing the COT in an FDM manner with both the first UE and the second UE. The third UE also sends transmission 652 on subchannel 622 during symbol 610.

In the example transmission timeline, a fourth UE (e.g., UE 120*d*, shown in FIG. 1) determines (e.g., based on decoding the control channel 632) that the fourth UE can send a transmission 660 on subchannel 624 during symbol 610 without performing LBT; that is, the fourth UE determines that the fourth UE can share the COT acquired by the first UE. The fourth UE also sends a transmission 662 on subchannel 624 during symbol 612. By sending the transmission 660 on subchannel 624 during symbol 610 while the third UE is sending transmission 652 on subchannel 622, the fourth UE is performing FDM COT sharing with the third UE, or sharing the COT in an FDM manner with the third UE. By sending the transmissions 660 and 662 on subchannel 624 during symbols 610 and 612 after the first UE sends transmissions 630, 634, and 636 on subchannel 624, the fourth UE is also performing TDM COT sharing, or sharing the COT in a TDM manner with the first UE.

Figure 7:
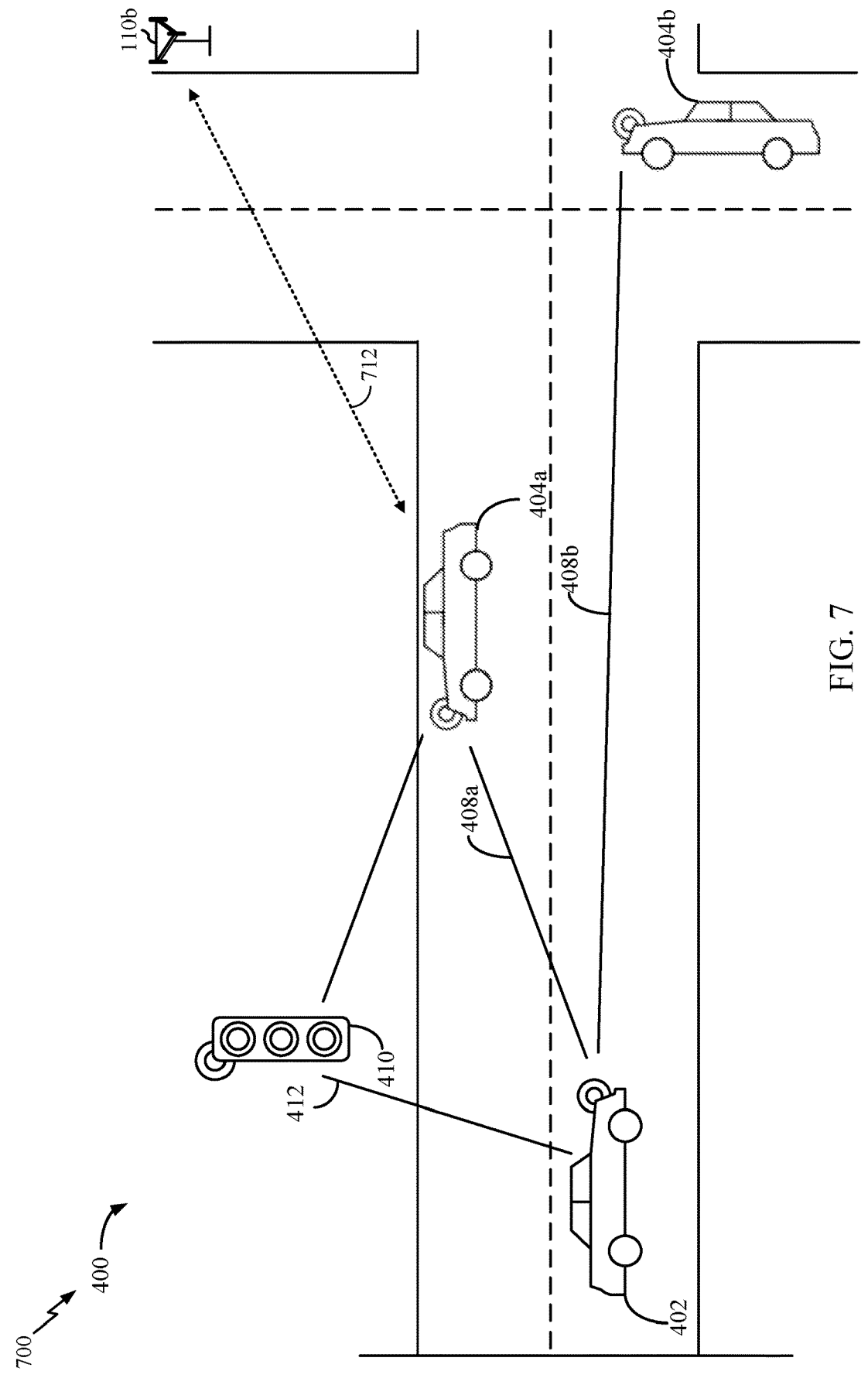
FIG. 7 illustrates a COT being extended in space, in accordance with certain aspects of the present disclosure.

FIG. 7 shows an example wireless communications system 700 including the example CV2X system 400 with vehicles 402, 404*a*, and 404*b*, as previously illustrated in FIG. 4A. Items shown in FIG. 4A are not further described. In certain aspects, communications between the vehicles 402 and 404*a* may occur through a PC5 interface 408*a*, and communications between the vehicles 402 and 404*b* may occur through a PC5 interface 408*b*. FIG. 7 also illustrates the issue of a COT being "extended in space." In FIG. 7, the vehicle 402 acquires a COT (e.g., by performing LBT) for an unlicensed frequency band. The vehicle 404*a* shares the COT acquired by the vehicle 402 and transmits signaling on the unlicensed frequency band without performing LBT on the unlicensed frequency band. The signaling is detected by BS 110*b* (e.g., a Wi-Fi access point that is not CV2X compliant), which may experience the signaling as interference 712, because the BS is far from vehicle 402 and therefore did not detect that vehicle 402 performed LBT and acquired the COT.

Accordingly, techniques and apparatus for a user equipment (UE), prior to transmitting cellular vehicle to everything (CV2X) signals using subchannels of unlicensed spectrum, to perform listen before talk (LBT) procedures based on the subchannels are provided.

Example Subchannel-Based Listen Before Talk for Unlicensed Channel Access

Certain aspects of the present disclosure provide for a user equipment (e.g., a CV2X UE) to transmit a signal in a subchannel of a (e.g., unlicensed) frequency band (e.g., an unlicensed channel) during at least a portion of a channel occupancy time (COT) for the frequency band acquired by another UE, based on a listen before talk (LBT) procedure performed on the unused subchannel(s) (e.g., excluding subchannel(s) on which the other UE is transmitting) for the portion of the COT. That is, a UE can share a COT, acquired by another UE, to transmit on a subchannel for a time period corresponding to at least a portion of the COT. The UE shares the COT by measuring, prior to the time period, a received signal strength (e.g., received signal strength indicator (RSSI) or reference signal received power (RSRP)) of one or more subchannels not allocated to other UEs (e.g., for the other UEs to transmit on) and transmitting on the measured subchannel(s) when the received signal strength is less than or equal to a threshold.

Figures 8A, 8B:
FIGS. 8A and 8B illustrate devices determining whether to extend a COT in space, in accordance with certain aspects of the present disclosure.

FIGS. 8A and 8B show example wireless communications systems 800 and 850 including items previously described in FIG. 4A that are not further described. FIG. 8A also illustrates a COT being extended in space. In FIG. 8A, the vehicle 402 acquires a COT (e.g., by performing LBT) for an unlicensed frequency band. The vehicle 404 receives a transmission from the vehicle 402 in a subchannel (e.g., a subband) and measures a signal strength (e.g., RSSI or RSRP) in other subchannels not containing the transmission. The vehicle 404 determines that the signal strength is less than or equal to a threshold and shares the COT acquired by the vehicle 402. The vehicle 404 transmits signaling 812 on one or more of the other subchannels of the unlicensed frequency band after performing an LBT on those other subchannels. The signaling is detected by BS 110*b* (shown in FIG. 1), which may consider the signaling as signaling 812 by a device that has a COT for the unlicensed frequency, because the BS is relatively near to vehicle 402 and therefore may detect that vehicle 402 acquired the COT.

In FIG. 8B, the vehicle 402 acquires a COT (e.g., by performing LBT) for an unlicensed frequency band. The vehicle 404 receives a transmission (e.g., a physical sidelink control channel (PSCCH)) from the vehicle 402 and measures a signal strength (e.g., RSSI or RSRP) in other subchannels not containing the transmission. The vehicle 404 detects that the signal strength is more than the threshold (e.g., because BS 110b transmits in the unlicensed frequency) and does not share the COT acquired by the vehicle 402. The vehicle 404 does not transmit signaling on the unlicensed frequency band because the LBT the vehicle performed on the subchannels of the unlicensed frequency band indicated the unlicensed frequency band was occupied. Because the vehicle 404 is relatively far from vehicle 402, other nearby devices (e.g., BS 110b) may not detect that vehicle 402 acquired the COT nor that vehicle 402 is transmitting. The other devices may expect that they can transmit on the unlicensed frequency band after performing an LBT. It should be noted that for simplicity, the vehicle 402 is described as both acquiring the COT and transmitting in a subchannel on which the vehicle 404 does not measure signal strength. However, in certain aspects, other devices may have been allocated subchannel resources, and the vehicle 404 may measure or not measure signal strength on the subchannel resources allocated to the other devices, as described in other examples herein.

Figure 9:
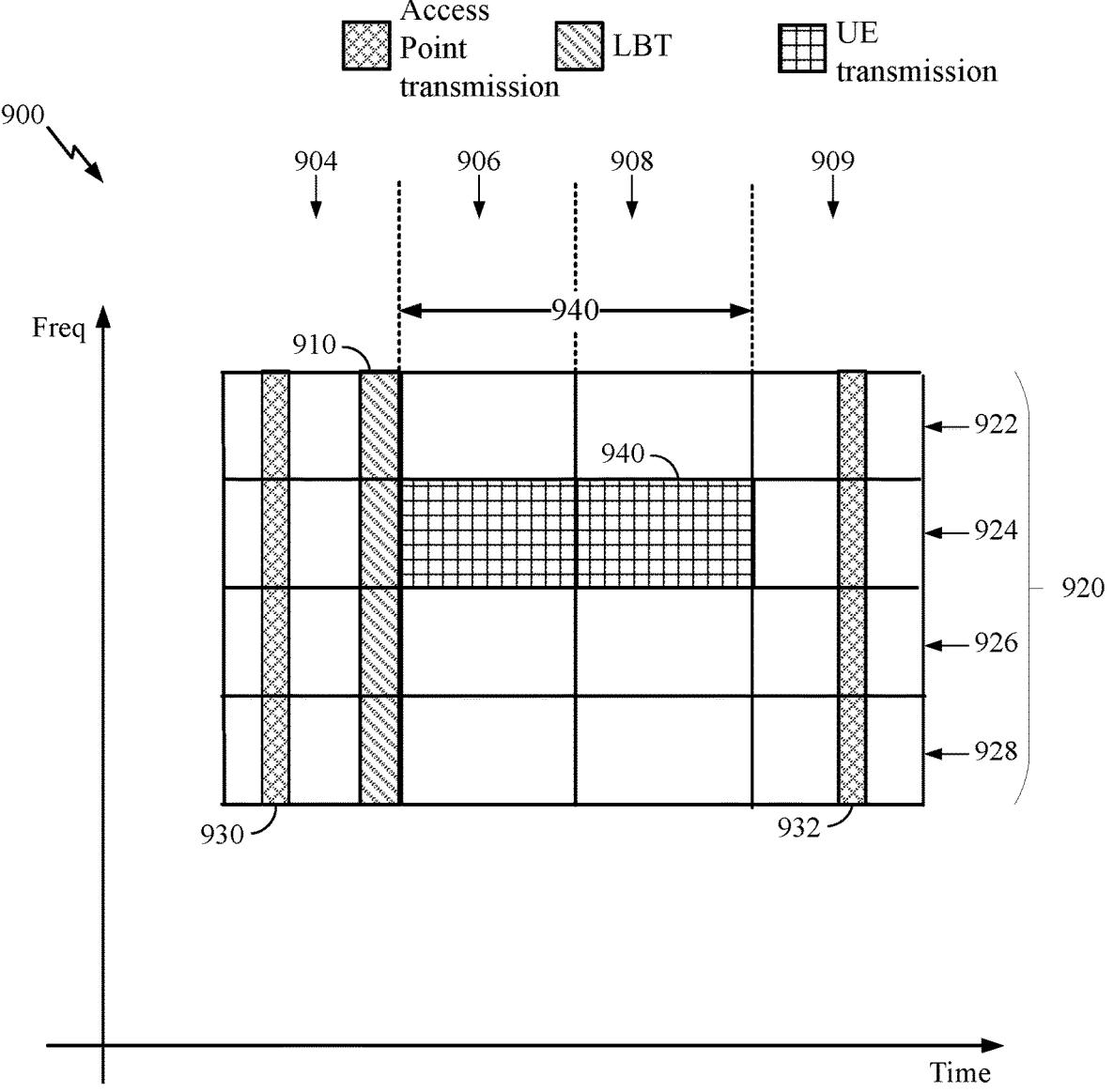
FIG. 9 is an exemplary transmission timeline of devices in a CV2X communications system, in accordance with certain aspects of the present disclosure.

FIG. 9 is an example transmission timeline 900 of devices in a CV2X communications system. The example transmission timeline includes four slots 904, 906, 908, and 909. In the example transmission timeline, a first UE (e.g., UE 402, shown in FIG. 8B) has data to transmit over slots 906 and 908. The UE performs an LBT 910 prior to slot 906. After the LBT successfully completes (e.g., the LBT identifies that the channel is idle), the UE initiates a COT 940 starting at start of slot 906 that lasts for at least 2 slots. As illustrated, the UE senses energy over the whole bandwidth of frequency band 920 during the LBT 910. The UE transmits transmission 940 over the subchannel 924, but not over the subchannels 922, 926, and 928. Also, the transmission 940 continuously utilizes at least a portion of the frequency band 920 during the COT 940. At 930 and 932, a Wi-Fi AP (e.g., BS 110a) accesses the channel when the channel is idle after the Wi-Fi AP performs an LBT (not shown).

Figure 10:
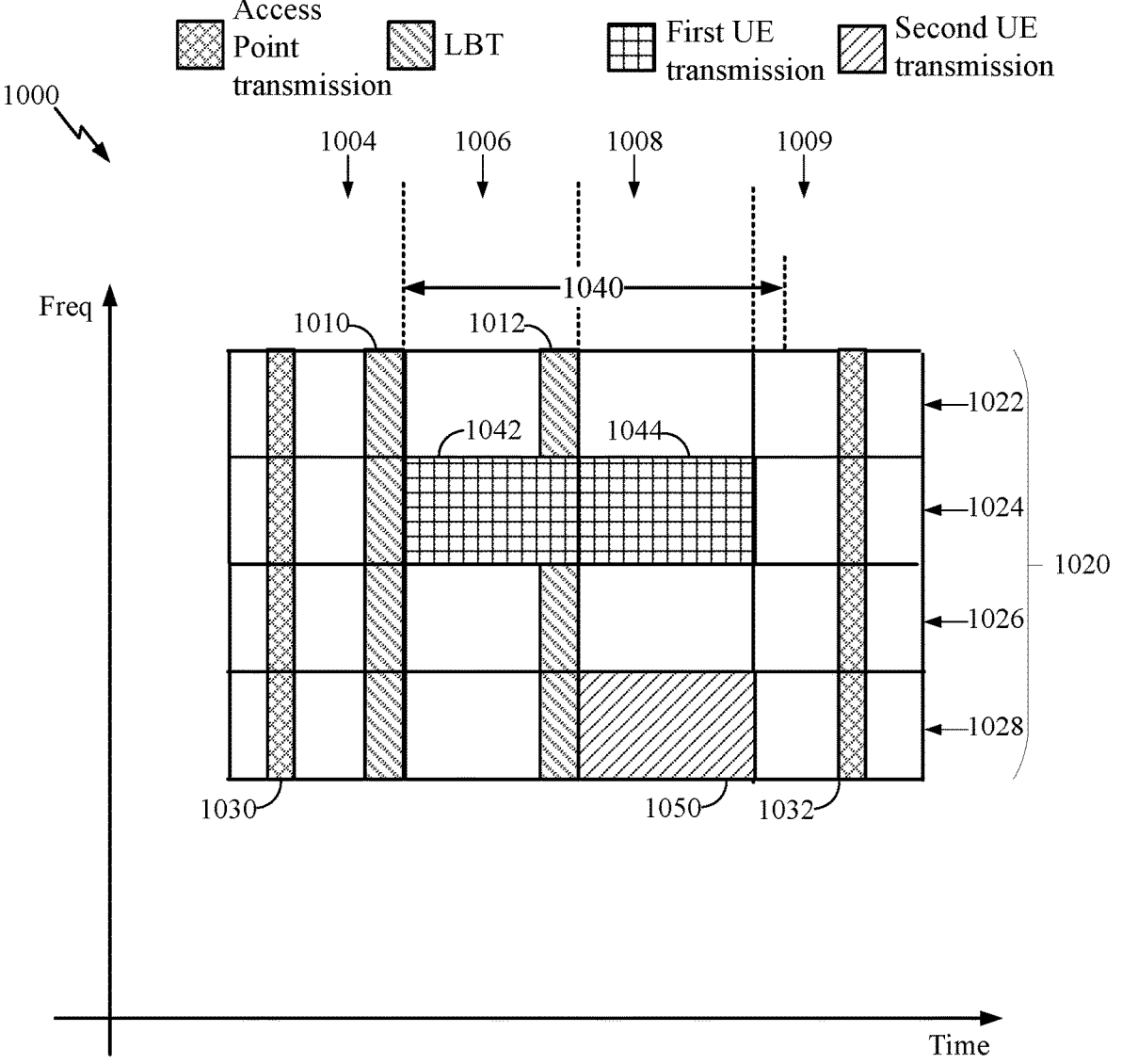
FIG. 10 is an exemplary transmission timeline of devices in a CV2X communications system, in accordance with certain aspects of the present disclosure.

FIG. 10 is an example transmission timeline 1000 of devices in a CV2X communications system. The example transmission timeline includes four slots 1004, 1006, 1008, and 1009. In the example transmission timeline, a first UE (e.g., UE 402, shown in FIG. 8B) has data to transmit over slots 1006 and 1008. The first UE performs an LBT 1010 prior to slot 1006. After the LBT successfully completes, the first UE initiates a COT 1040 starting at start of slot 1006 that lasts for at least 2 slots. As illustrated, the first UE senses energy over the whole bandwidth of frequency band 1020 during the LBT 1010. The first UE transmits over the subchannel 1024, but not over the subchannels 1022, 1026, and 1028.

In the example transmission timeline, a second UE (e.g., UE 404, shown in FIG. 8B, which may be a CV2X device) has data to transmit over the slot 1008. In certain cases, the second UE performs an LBT 1012 prior to transmitting on the slot 1008. Without the techniques discussed herein, the second UE may sense that the channel is busy due to the transmission from the first UE at 1042 and 1044. Utilizing techniques discussed herein, the second UE can select a different subchannel 1028 for the transmission 1050. The second UE can decode sidelink control information (SCI, e.g., in a PSCCH) in the transmission 1042 from the first UE at slot 1006 and determine that the first UE will transmit over the same subchannel 1024 during slot 1008. The second UE shares in the COT 1040 by transmitting a signal 1050 on subchannel 1028 without performing an LBT for the channel 1020. At 1030 and 1032, a Wi-Fi AP (e.g., BS 110a) performs an LBT (not shown) and accesses the channel when the channel is idle.

According to certain aspects, COT sharing as described above with reference to FIG. 10 effectively expands in space the COT initiated by a first UE (e.g. UE 402, shown in FIG. 8B). However, in certain aspects, the first UE that initiated the COT may sense interference activity (e.g., Wi-Fi transmissions, such as from BS 102a or BS 102b, shown in FIG. 8B) near the first UE when performing an LBT, and not interference activity farther from the first UE that is not of enough power as received at the first UE to determine the frequency band as busy. Further, in certain aspects, the subsequent transmissions (e.g., transmissions 1042 and 1044, shown in FIG. 10) of the COT-initiating first UE may be sensed by a local Wi-Fi AP (e.g., BS 102a) near the first UE when performing an LBT, and not by a Wi-Fi AP farther from the first UE. This may result in two issues:

1) Even though the COT-initiating first UE sensed that the frequency band was idle near the first UE, there could be interference activity at that time (e.g., prior to and/or during slots 1006 and 1008 in FIG. 10) in the proximity of a second UE (e.g., UE 404, shown in FIG. 8B); and 2) Other non-CV2X devices (e.g., Wi-Fi APs) proximate to the second UE may not detect transmissions from the first UE and may initiate a transmission during the COT of the first UE.

Based on these two issues, if the second UE were to share the COT of the first UE, and transmit in the frequency band without performing LBT, it may interfere with transmissions of a non-CV2X device near the second UE that the first UE did not sense as transmitting.

Figure 11:
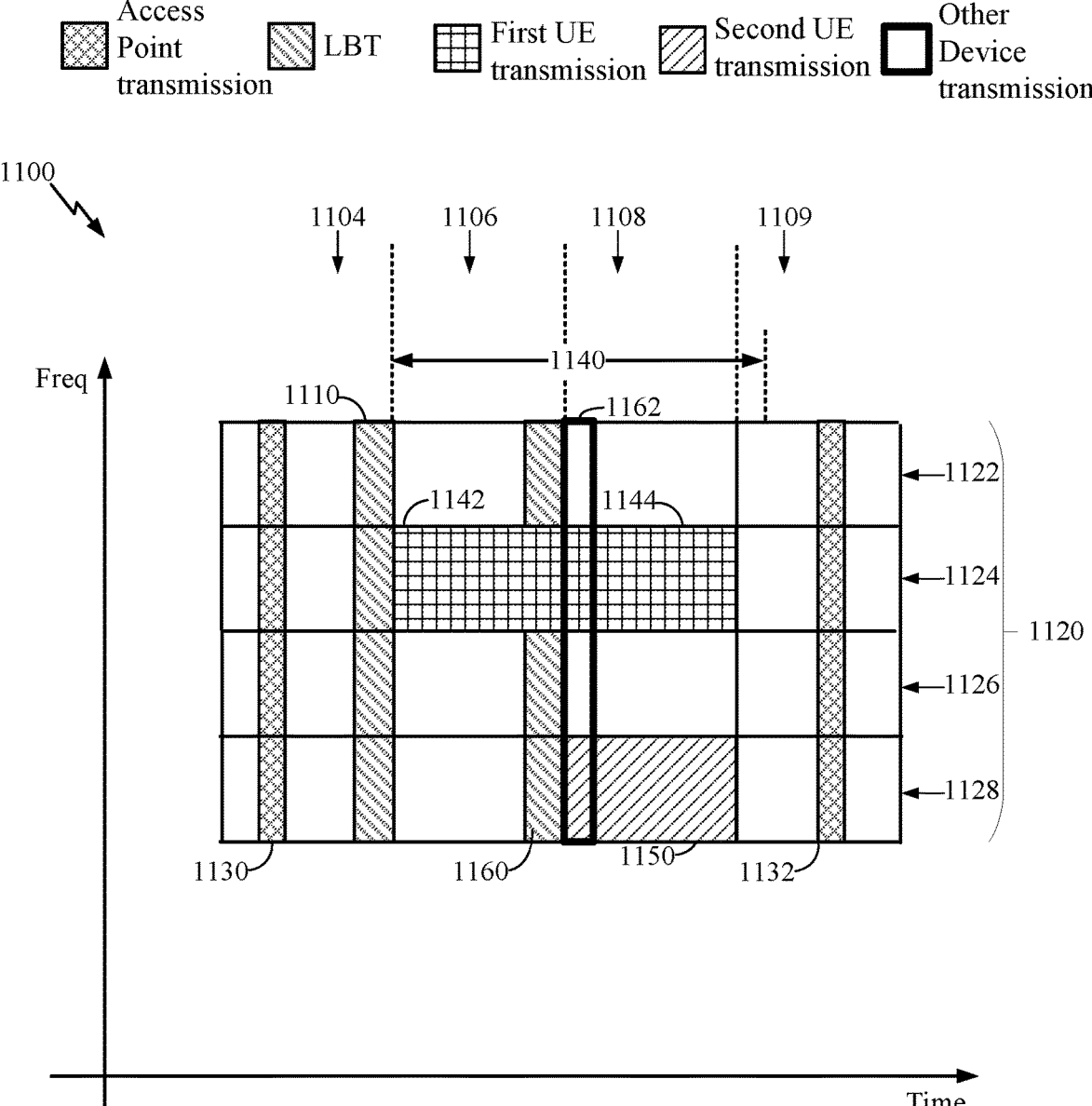
FIG. 11 is an exemplary transmission timeline of devices in a CV2X communications system, in accordance with certain aspects of the present disclosure.

FIG. 11 is an example transmission timeline 1100 of devices in a CV2X communications system. The example transmission timeline includes four slots 1104, 1106, 1108, and 1109. In the example transmission timeline, a first UE (e.g., UE 402, shown in FIG. 8B) has data to transmit over slots 1106 and 1108. The first UE performs an LBT 1110 prior to slot 1106. After the LBT 1110 successfully completes, the first UE initiates a COT 1140, beginning at the start of slot 1106, that lasts for at least 2 slots. As illustrated, the first UE senses energy over the whole bandwidth of frequency band 1120 during the LBT 1110. The first UE transmits over the subchannel 1124, but not over the subchannels 1122, 1126, and 1128. In the example transmission timeline, a second UE (e.g., UE 404, shown in FIG. 8B) that is a CV2X device has data to transmit over the slot 1108. In addition, another non-CV2X device, which may be proximal to the second UE, (e.g., BS 110b, shown in FIG. 8B) has data to transmit. The other device completes an LBT 1160 just prior to slot 1108 and does not detect (e.g., due to path loss to the first UE) the transmissions 1142 and 1144 by the first UE. The other device then initiates a transmission 1162. Accordingly, as shown in timeline 1100, in the beginning part of slot 1108, the transmission 1162 by the other device overlaps with the transmission 1144 by the first UE in the subchannel 1124. The second UE shares the first-UE-initiated COT 1140 without performing LBT and selects the subchannel 1128 to avoid causing a collision with the transmissions from the first UE. Because the second UE does not perform an LBT, the second UE does not sense the transmission 1162 by the other device, resulting in a collision with the transmission by the other device. Accordingly, as shown in timeline 1100, in the beginning part of slot 1108, the transmission 1162 by the other device overlaps with the transmission 1150 by the second UE in the subchannel 1128, causing interference. At 1130 and 1132, a Wi-Fi AP (e.g., BS 110a) accesses the channel when the channel is idle after performing an LBT (not shown).

According to certain aspects, a device (e.g., a UE) may utilize a currently active COT, initiated by another device (e.g., a CV2X device), by performing an LBT procedure that ignores channel activity due to CV2X signals (e.g., CV2X signals by the COT-initiating device or other CV2X devices sharing the COT).

In certain aspects, a device (e.g., a CV2X device) that is given information about which subchannels are utilized and during what time periods (e.g., slots) by one or more other CV2X device(s) over a currently active COT and has data to transmit in the same COT during one or more time periods may perform an LBT only over subchannels that are not used (e.g., transmitted on) by the other CV2X device(s) during the one or more time periods the device has data to transmit. By performing an LBT only over subchannels not used by the other CV2X device(s), the device may avoid sensing energy originating from the other CV2X devices and declaring that energy as channel activity.

According to certain aspects, if the modified LBT terminates successfully (that is, the device performing the LBT on only the available (e.g., not used by a CV2X device) subchannels does not detect enough energy to prevent a transmission on the subchannels), then the device (e.g., a CV2X device) may transmit in the one or more time periods within the COT over any of the available subchannels and avoid collisions with ongoing CV2X transmissions.

Figure 12:
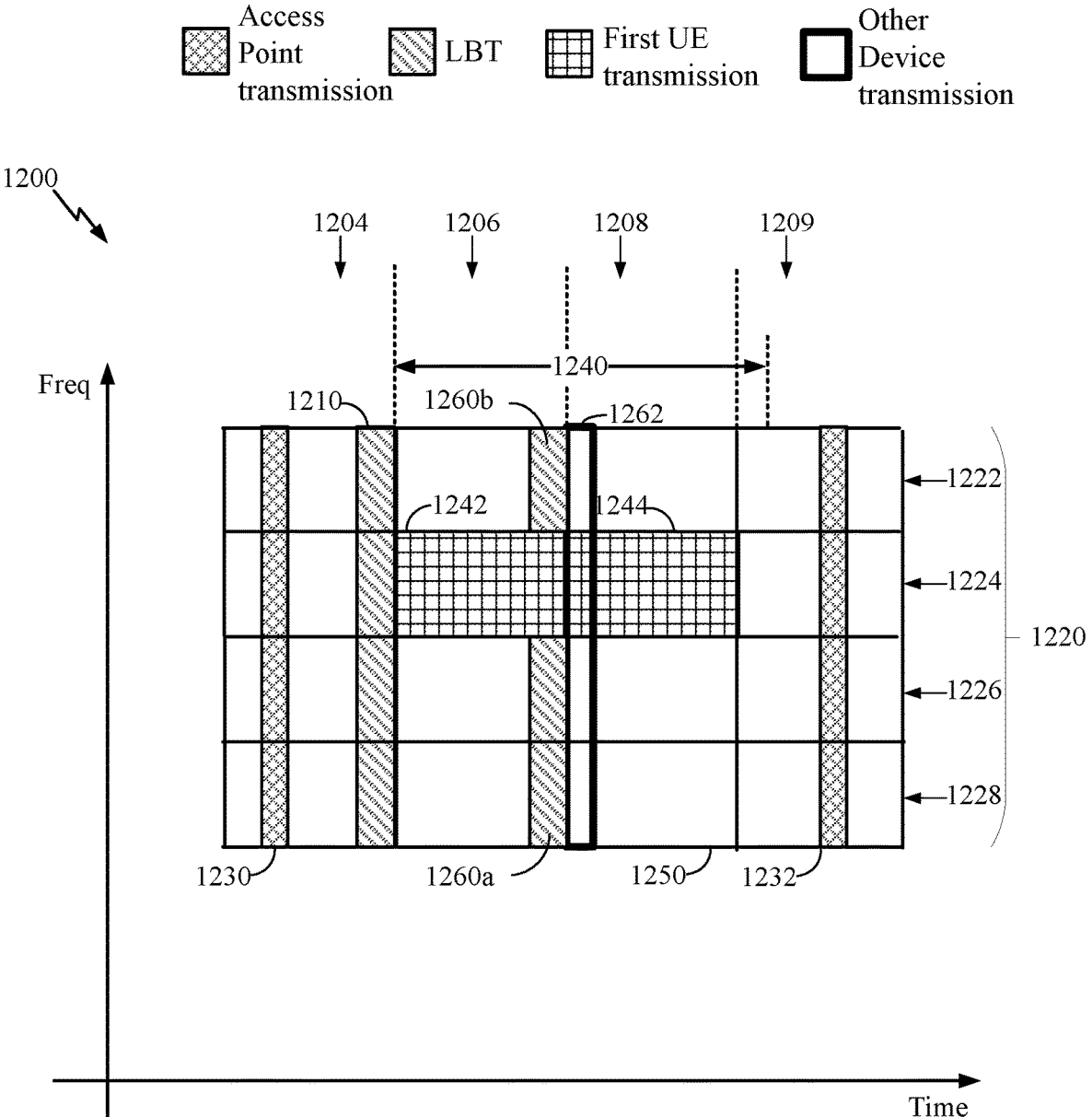
FIG. 12 is an exemplary transmission timeline of devices in a CV2X communications system, in accordance with certain aspects of the present disclosure.

FIG. 12 is an example transmission timeline 1200 of devices in a CV2X communications system operating in accordance with aspects of the present disclosure. The example transmission timeline includes four slots 1204, 1206, 1208, and 1209, although the present disclosure is not so limited, and aspects may be applicable to longer or shorter periods. In the example transmission timeline, a first UE (e.g., UE 402, shown in FIG. 8B) has data to transmit over slots 1206 and 1208. The first UE performs an LBT 1210 prior to slot 1206. After the LBT 1210 successfully completes, the first UE initiates a COT 1240 starting at start of slot 1206 that lasts for at least 2 slots. As illustrated, the first UE senses energy over the whole bandwidth of frequency band 1220 during the LBT 1210. The first UE transmits over the subchannel 1224, but not over the subchannels 1222, 1226, and 1228.

In the example transmission timeline, a second UE (e.g., UE 404, shown in FIG. 8B, which may be a CV2X device) has data to transmit over the slot 1208. In addition, another device (e.g., BS 110b, shown in FIG. 8B) has data to transmit. The other device completes an LBT (not shown) just prior to slot 1208 and does not detect (e.g., due to path loss to the first UE) the transmissions 1242 and 1244 by the first UE. The other device then initiates a transmission 1262. Accordingly, as shown in timeline 1200, in the beginning part of slot 1208, the transmission 1262 by the other device overlaps with the transmission 1244 by the first UE in the subchannel 1224. The second UE decodes SCI transmitted by the first UE (e.g., in the transmission 1242) and performs a subchannel-based LBT 1260a and 1260b on the subchannels 1222, 1226, and 1228 to avoid measuring the transmissions from the first UE and detecting interference based on the transmissions of the first UE. The second UE detects the transmission 1262 by the other device during the subchannel-based LBT, and determines not to transmit on subchannel 1228 during slot 1208, thus avoiding a collision with the transmission by the other device. At 1230 and 1232, a Wi-Fi AP (e.g., BS 110a) performs an LBT (not shown) and accesses the channel when the channel is idle.

In certain aspects, during LBT (e.g., a wideband LBT or an LBT that is not subchannel-based as described herein), a channel is declared as busy (e.g., not available for transmission) when a signal energy (e.g., received signal strength indicator (RSSI)) greater than a threshold is detected.

In certain aspects, a threshold (e.g., a signal strength or RSSI threshold) used for declaring (e.g., by a CV2X device) a channel as busy when performing subchannel-based LBT may be proportional to a percentage of the threshold that would be applied if all the subchannels were sensed as in a wideband LBT. For example, an unlicensed channel (e.g., a channel on which a device is performing a subchannel-based LBT) may consist of N (e.g., one or more) subchannels. A device (e.g., a CV2X UE) may perform an LBT on only a portion of the total bandwidth of the channel consisting of M not necessarily contiguous subchannels, where M≤N. If T is an LBT threshold value for declaring a busy channel for an LBT procedure using sensing across the entire bandwidth of the unlicensed channel, then each subchannel effectively contributes a fraction (e.g., 1/N) of the threshold value, T. Thus, in certain aspects, when the device measures M subchannels, then the device uses a threshold equal to $M*(1/N)*T$.

According to certain aspects, the above described rule of proportionality is desirable when the subchannel energy sensing by the device is ideal; that is, the above described rule of proportionality may be desirable when the energy of the CV2X-active subchannels can be ideally filtered out by the device.

In certain aspects, the energy sensing in a subchannel-based LBT procedure is performed over the same pre-defined time interval as a wideband LBT procedure.

According to certain aspects, subchannel energy measurement may not be perfect, due to energy leakage effects.

Figure 13:
FIG. 13 is an example channel energy graph illustrating energy leakage, in accordance with aspects of the present disclosure.
Figure 13:
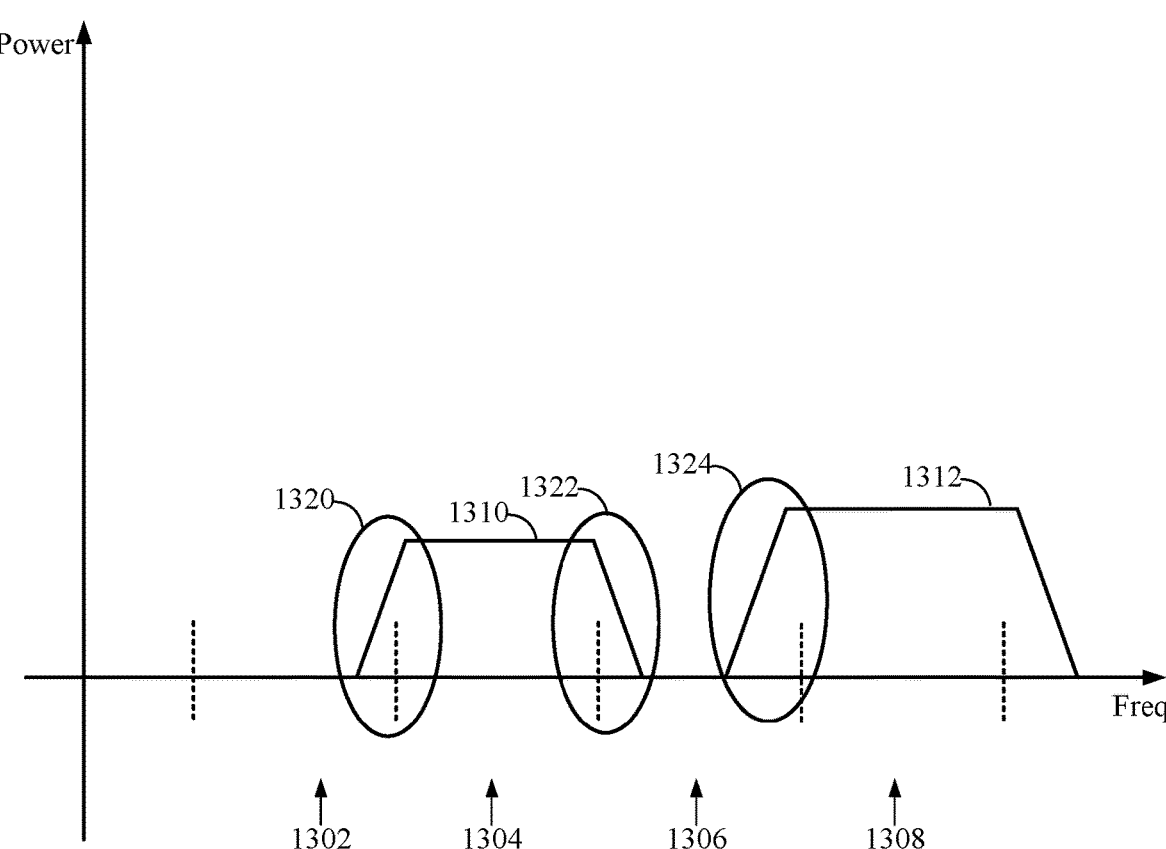

FIG. 13 is an example channel energy graph 1300 illustrating energy leakage, in accordance with aspects of the present disclosure. In the example graph, an example channel has a total of 4 subchannels, 1302, 1304, 1306, and 1308. As discussed a channel may have any suitable number of subchannels. In the example, a device (e.g., a CV2X UE) detects CV2X activity within an initiated COT over the subchannels 1304 and 1308. In an effort to share the COT, the device performs subchannel-based LBT sensing over the subchannels 1302 and 1306. Even without any interference activity or noise over subchannels 1302 and 1306, the subchannel-based LBT may sense energy over subchannels 1302 and 1306 due to energy leakage 1320, 1322, and 1324 from the CV2X transmissions 1310 and 1312.

In certain aspects, the energy leakage may be greater when the CV2X signal originates from a nearby device (e.g., due to a near-far effect).

According to certain aspects, a subchannel may be sensed (e.g., by a device performing a subchannel-based LBT) as busy due to energy leakage from CV2X transmissions on other subchannels, when the subchannel is not actually busy.

In certain aspects, a device may measure energy over any subchannel while excluding (e.g., not measuring) frequencies within subbands (e.g., exclusion subbands) on both sides of CV2X-occupied subchannels.

According to certain aspects, sizes of the above-described exclusion subbands may be fixed (e.g., pre-configured). For example, exclusion subband sizes may be pre-configured based on a worst-case scenario.

In certain aspects, a device may determine sizes of the above-described exclusion subbands adaptively. For example, a device may determine a size of exclusion subband based on reference signal received power (RSRP) of a CV2X signal in an adjacent subchannel. According to some aspects a larger RSRP may imply that there is more leakage from the CV2X signal, and therefore larger exclusion subband size (e.g., a guard band size) may be desirable. In some aspects of the present disclosure, sizes of the above-described exclusion subbands may be determined based on a position of a CV2X transmitter. For example, an energy-sensing device (e.g., a CV2X UE that desires to share a COT) may identify a position of a transmitting UE from SCI (e.g., a zone identifier (ID) that may be included in SCI), and, if the transmitting UE is close to the energy-sensing device, then the energy-sensing device determines to use a larger exclusion subband (e.g., guard band) size.

Figure 14:
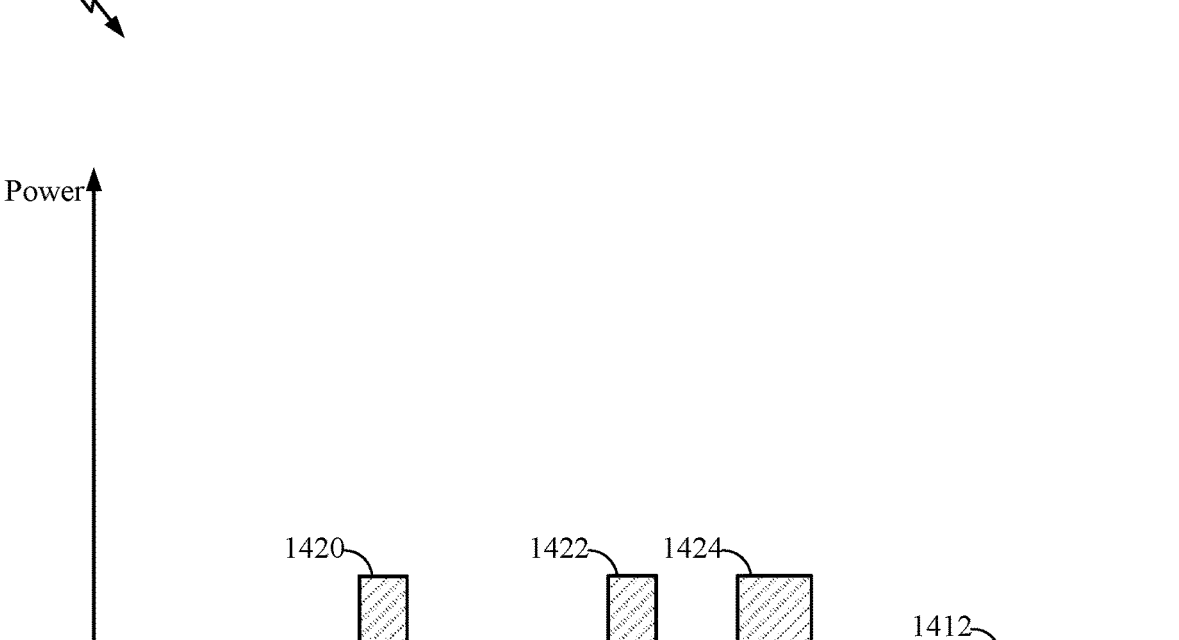
FIG. 14 is an example channel energy graph illustrating adaptively determined exclusion subbands, in accordance with aspects of the present disclosure.

FIG. 14 is an example channel energy graph 1400 illustrating adaptively determined exclusion subbands, in accordance with aspects of the present disclosure. In the example graph, a channel has a total of 4 subchannels, 1402, 1404, 1406, and 1408. As discussed a channel may have any suitable number of subchannels. In the example, a device (e.g., a CV2X UE) detects CV2X activity within an initiated COT over the subchannels 1404 and 1408. In an effort to share the COT, the device performs subchannel-based LBT sensing over the subchannels 1402 and 1406. The device determines to use exclusion subbands 1420 and 1422 to exclude energy leakage from the transmission 1410. The device also determines to use a larger exclusion subband 1424 to exclude energy leakage from the higher-power transmission 1412. Accordingly, subbands 1420, 1422, and 1424 are examples of one or more frequency subbands within one or more unallocated subchannels 1402 and 1406 that are adjacent to one or more allocated subchannels 1404 and 1408.

According to certain aspects, exclusion subbands useful for eliminating CV2X signal leakage as described above may also eliminate a part of any interference energy that is present in the excluded subbands.

In certain aspects, a device may determine an energy detection threshold for busy channel declaration based on a size of one or more exclusion subbands applied to measuring energy in subchannels. Thus, the larger an exclusion subband is with respect to a subchannel, the smaller that subchannel contribution to determining the energy threshold. For example, when a device is performing energy sensing over M=2 out of a total of N=4 subchannels (e.g., a subchannel-based LBT) then a basic threshold, as previously described herein, equal to $2*(\frac{1}{4})*T$ may be determined by the device. A first subchannel energy measurement excludes 10% and 25% of left and right edges of the subchannel (see, e.g., subchannel 1406, shown in FIG. 14), respectively. A second subchannel energy measurement may exclude 25% of a right edge of the subchannel (see, e.g., subchannel 1402, shown in FIG. 14). 65% of the first subchannel and 75% of the second subchannel frequencies are measured, and thus, the refined energy detection threshold may be $0.65*(\frac{1}{4})*T+ 0.75*(\frac{1}{4})*T$.

According to certain aspects, in a wideband LBT procedure, a device (e.g., a CV2X UE) may measure the total energy of the channel by summing over all of the subcarriers of the channel at an output of a receiver inverse fast Fourier transform (IFFT) module. In certain aspects, in a subband-based LBT procedure, only the subcarriers corresponding to the measured subbands (e.g., subchannels) and not included in the corresponding exclusion subbands (e.g., guard bands) are measured.

Optionally, in some aspects of the present disclosure, an input signal to a receiver fast Fourier transform (FFT) module may first be applied to a filterbank that is adjusted to filter out subchannels occupied by CV2X signals. These aspects may result in better performance than the above described summing over subcarriers at an output of a receiver IFFT module, since CV2X energy contributions will tend to be smaller. Usage of a filterbank may have a cost in terms of implementation complexity and extra latency, due to the filtering operation.

Figure 15:
FIG. 15 is an example channel energy graph illustrating use of a filterbank, in accordance with aspects of the present disclosure.
Figure 15:
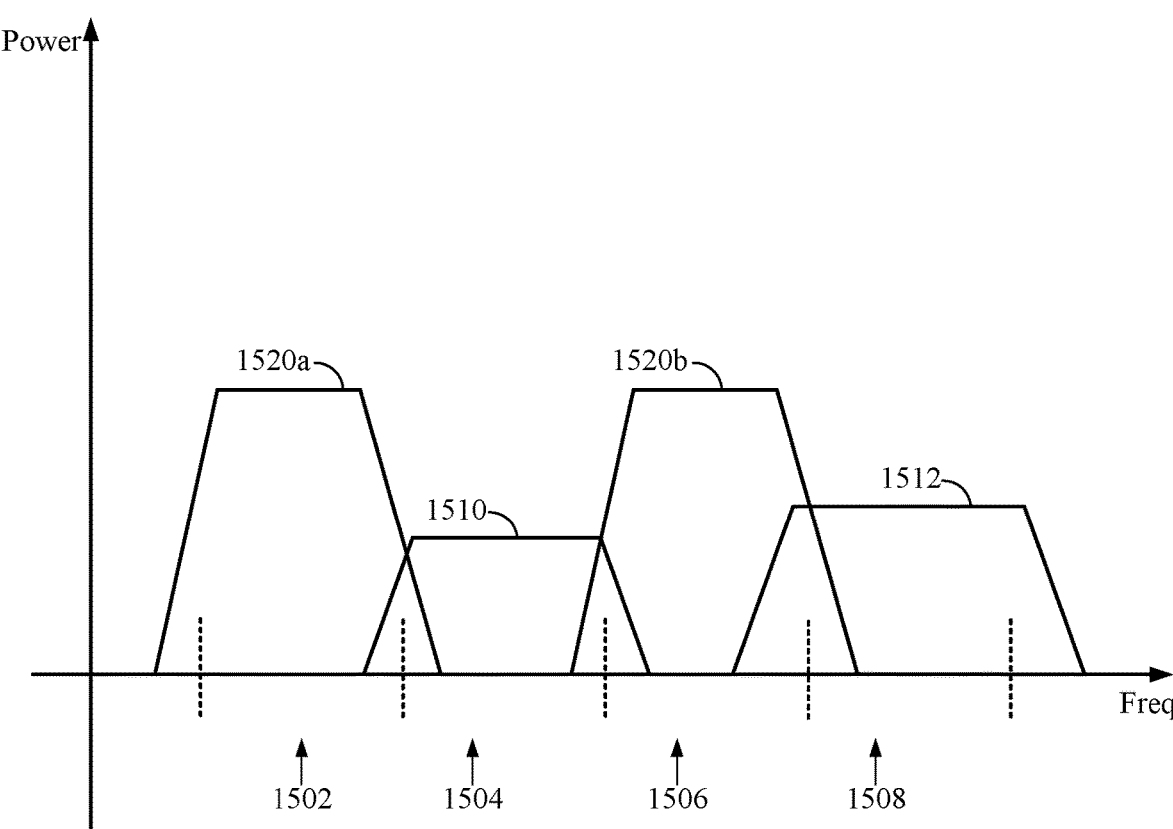

FIG. 15 is an example channel energy graph 1500 illustrating use of a filterbank, in accordance with aspects of the present disclosure. In the example graph 1500, a channel has a total of 4 subchannels, 1502, 1504, 1506, and 1508. In the example, a device (e.g., a CV2X UE) detects CV2X activity within an initiated COT over the subchannels 1504 and 1508. In an effort to share the COT, the device applies a filterbank 1520a and 1520b that excludes the subchannels 1504 and 1508 to the input signals 1510 and 1512 before performing subchannel-based LBT sensing over the subchannels 1502 and 1506.

FIG. 16 is a flow diagram illustrating example operations 1600 for wireless communication, in accordance with certain aspects of the present disclosure. The operations 1600 may be performed, for example, by a UE (e.g., the UE 120a in the wireless communication network 100). The operations 1600 may be implemented as software components that are executed and run on one or more processors (e.g., controller/processor 280 of FIG. 2). Further, the transmission and reception of signals by the UE in operations 1600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1600 may begin, at block 1602, where the UE may receive one or more transmissions indicating that a device has acquired a frequency band for a channel occupancy time (COT) for communication by one or more devices including the UE, the one or more transmissions further indicating one or more allocated subchannels of the frequency band that are allocated to at least one device other than the UE during a first time period of the COT, the frequency band comprising the one or more allocated subchannels and one or more unallocated subchannels during the first time period.

At block 1604, operations 1600 may continue where the UE may measure a signal strength of only the one or more unallocated subchannels for at least a portion of the first time period prior to a second time period of the COT.

Operations 1600 may optionally continue at block 1606 where the UE may calculate a threshold based on a ratio of a first bandwidth of the one or more unallocated subchannels to a second bandwidth of the frequency band.

At block 1608, operations 1600 may optionally continue where the first UE may calculate a threshold based on a ratio of a first bandwidth of the one or more unallocated subchannels excluding the one or more frequency subbands to a second bandwidth of the frequency band.

Operations 1600 may continue at block 1610, when the measured signal strength is less than a threshold (which may be one of the thresholds calculated at block 1606 and/or block 1608), the UE may transmit a signal within the frequency band during the second time period.

According to certain aspects, the threshold of block 1606 may be based on a ratio of a first bandwidth of the one or more unallocated subchannels of block 1602 to a second bandwidth of the frequency band of block 1602.

In certain aspects, measuring the signal strength of only the one or more unallocated subchannels as in block 1604 may include measuring the signal strength of only the one or more unallocated subchannels excluding one or more frequency subbands within the one or more unallocated subchannels that are adjacent to the one or more allocated subchannels. In some such aspects, the threshold of block 1606 may be based on a ratio of a first bandwidth of the one or more unallocated subchannels excluding the one or more frequency subbands to a second bandwidth of the frequency band. In some other such aspects, a bandwidth of each of the one or more frequency subbands (e.g., the exclusion subbands as described herein with respect to FIG. 14) may be fixed (e.g., pre-configured) or configured by another wireless communication device. In still other such aspects, for each of the one or more frequency subbands, a corresponding bandwidth of the corresponding frequency subband may be based on a corresponding signal strength of a corresponding signal received on a corresponding allocated subchannel adjacent to the corresponding frequency subband. In other words, the bandwidth determined for each of the subbands (e.g., the exclusion subbands as described herein with respect to FIG. 14) that are excluded from the sensing may be determined based on the signal strength of a signal received on one of the allocated subchannels adjacent to such a subband. For example, a larger bandwidth may be assigned to an exclusion subband if a high RSRP is sensed on the allocated subchannel adjacent to the exclusion subband. As an example, a smaller bandwidth may be assigned to an exclusion subband if a low RSRP is sensed on the allocated subchannel adjacent to the exclusion subband. In some other such aspects, for each of the one or more frequency subbands, a corresponding bandwidth of the corresponding frequency subband may be based on a corresponding distance between the UE and a corresponding device allocated a corresponding allocated subchannel adjacent to the corresponding frequency subband. That is, the bandwidth determined for each of the exclusion subbands may be determined based on a distance between the UE and the other device that allocated the subchannels. For example, a larger bandwidth may be assigned to an exclusion subband if the UE and other device are in close proximity of each other. As an example, a smaller bandwidth may be used for an exclusion subband if the UE and the other device are not in close proximity of each other.

According to certain aspects, measuring the signal strength as in block 1604 may include: applying a filter bank to an input signal corresponding to the frequency band, the filter bank configured to filter the one or more allocated subchannels from the input signal; and measuring the signal strength of the filtered input signal.

In certain aspects, the first time period of block 1602 and the second time period of block 1604 may each be a slot.

According to certain aspects, the communication by the one or more devices of block 1602 may correspond to sidelink communications. In some such aspects, the one or more devices may be CV2X devices.

In aspects, the frequency band of block 1602 may include an unlicensed band.

FIG. 17 is a flow diagram illustrating example operations 1700 for wireless communication, in accordance with certain aspects of the present disclosure. The operations 1700 may be performed, for example, by a first UE (e.g., the UE

120a in the wireless communication network 100). The operations 1700 may be implemented as software components that are executed and run on one or more processors (e.g., controller/processor 280 of FIG. 2). Further, the transmission and reception of signals by the UE in operations 1700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 1700 may begin, at block 1702, where the first UE may receive one or more transmissions indicating one or more allocated subchannels of a frequency band, where the subchannels are allocated during a first time period, and the frequency band comprises the allocated subchannels and one or more unallocated subchannels during the first time period. For example, the first UE may preform an LBT procedure to determine if subchannel is occupied by another wireless communication device. The first UE (e.g., the vehicle 404 depicted in FIGS. 8A and 8B) may receive the transmissions from a second UE (e.g., the vehicle 402 depicted in FIGS. 8A and 8B) in an unlicensed frequency band.

At block 1704, the first UE may sense (e.g., only) the unallocated subchannels for at least a portion of the first time period prior to a second time period. For example, the first UE may monitor for any signals in the unallocated subchannels from other wireless communication device(s) during a portion of the first time period.

Optionally, at block 1706, the first UE may calculate a threshold based on a ratio of a first bandwidth of the one or more unallocated subchannels to a second bandwidth of the frequency band.

Optionally, at block 1708, the first UE may calculate a threshold based on a ratio of a first bandwidth of the one or more unallocated subchannels excluding the one or more frequency subbands to a second bandwidth of the frequency band.

At block 1710, the first UE may transmit a signal within the frequency band during the second time period based on energy sensed for the one or more unallocated subchannels being less than a threshold, which may be one of the thresholds calculated at block 1606 and/or block 1608. The first UE may determine that the energy sensed for the unallocated subchannels is less than the threshold, and the first UE may consider the unallocated subchannels to be unoccupied and open for sharing a COT with the second UE during the second time period, for example, as described herein with respect to FIG. 8A. In certain cases, the first UE may determine that the energy sensed for the unallocated subchannels is equal to or greater than the threshold, and the first UE may refrain from transmitting on the unallocated subchannels during the second time period, for example, as described herein with respect to FIG. 8B.

According to certain aspects, the first UE may perform the operations 1700 as described herein with respect to FIGS. 8A-16 and the operations 1600. For example, the sensing at block 1704 may involve the first UE sensing only the unallocated subchannels excluding one or more frequency subbands within the unallocated subchannels that are adjacent to the allocated subchannels. In certain cases, the first time period and the second time period may each comprise a slot. A COT may include the first time period and the second time period.

FIG. 18 illustrates a communications device 1800 that may include various components (e.g., corresponding to means-plus-function components) configured to perform operations for the techniques disclosed herein, such as the operations illustrated in FIGS. 16 and/or 17. The communications device 1800 includes a processing system 1802 and circuitry 1824, 1826, and 1828 coupled to a transceiver 1808 (e.g., a transmitter and/or a receiver). The transceiver 1808 is configured to transmit and receive signals for the communications device 1800 via an antenna 1810, such as the various signals as described herein. The processing system 1802 may be configured to perform processing functions for the communications device 1800, including processing signals received and/or to be transmitted by the communications device 1800.

The processing system 1802 includes a processor 1804 coupled to a computer-readable medium/memory 1812 via a bus 1806. In certain aspects, the computer-readable medium/memory 1812 is configured to store instructions (e.g., computer-executable code) that when executed by the processor 1804, cause the processor 1804 to perform the operations illustrated in FIGS. 16 and/or 17, or other operations for performing the various techniques discussed herein for subchannel-based LBT. In certain aspects, computer-readable medium/memory 1812 stores code 1814 for receiving one or more transmissions indicating that a device has acquired a frequency band for a channel occupancy time (COT) for communication by one or more devices including the communications device 1800, the one or more transmissions further indicating one or more allocated subchannels of the frequency band that are allocated to at least one device other than the communications device during a first time period of the COT, the frequency band comprising the one or more allocated subchannels and one or more unallocated subchannels during the first time period; code 1816 for measuring a signal strength of only the one or more unallocated subchannels for at least a portion of the first time period prior to a second time period of the COT; and code 1818 for, when the measured signal strength is less than a threshold, transmitting a signal within the frequency band during the second time period.

In certain aspects, the processing system 1802 has circuitry configured to implement the code stored in the computer-readable medium/memory 1812. The processing system 1802 includes circuitry (e.g., an example of means for) 1824 for receiving one or more transmissions indicating that a device has acquired a frequency band for a channel occupancy time (COT) for communication by one or more devices including the communications device 1800, the one or more transmissions further indicating one or more allocated subchannels of the frequency band that are allocated to at least one device other than the communications device during a first time period of the COT, the frequency band comprising the one or more allocated subchannels and one or more unallocated subchannels during the first time period; circuitry (e.g., an example of means for) 1826 for measuring a signal strength of only the one or more unallocated subchannels for at least a portion of the first time period prior to a second time period of the COT; and circuitry (e.g., an example of means for) 1828 for, when the measured signal strength is less than a threshold, transmitting a signal within the frequency band during the second time period. One or more of circuitry 1824, 1826, and 1828 may be implemented by one or more of a digital signal processor (DSP), a circuit, an application specific integrated circuit (ASIC), or a processor (e.g., a general purpose or specifically programmed processor).

Various components of the communications device 1800 may provide means for performing the methods described herein, including with respect to FIGS. 16 and/or 17. In some examples, means for transmitting or sending (or means for outputting for transmission) may include the transceivers 254 and/or antenna(s) 252 of the user equipment 120 illustrated in FIG. 2 and/or transceiver 1808 and antenna 1810 of the communication device 1800 in FIG. 18. In some examples, means for receiving (or means for obtaining) may include the transceivers 254 and/or antenna(s) 252 of the user equipment 120 illustrated in FIG. 2 and/or transceiver 1808 and antenna 1810 of the communication device 1800 in FIG. 18. In some examples, means for sensing may include various processing system components, such as: the processor 1804 and/or the computer-readable medium/memory 1812 in FIG. 18, or aspects of the user equipment 120 depicted in FIG. 2, including MIMO detector 256, receive processor 258, transmit processor 264, TX MIMO processor 266, controller/processor 280 (including the subband LBT manager 281), and/or memory 282.

Example Aspects

In addition to the various aspects described above, specific combinations of aspects are within the scope of the disclosure, some of which are detailed below:

Aspect 1: A method of wireless communication by a first user equipment (UE), comprising: receiving one or more transmissions indicating that a device has acquired a frequency band for a channel occupancy time (COT) for communication by one or more devices including the first UE, the one or more transmissions further indicating one or more allocated subchannels of the frequency band that are allocated to at least one device other than the first UE during a first time period of the COT, the frequency band comprising the one or more allocated subchannels and one or more unallocated subchannels during the first time period; measuring a signal strength of only the one or more unallocated subchannels for at least a portion of the first time period prior to a second time period of the COT; and when the measured signal strength is less than a threshold, transmitting a signal within the frequency band during the second time period.

Aspect 2: The method of Aspect 1, wherein the threshold is based on a ratio of a first bandwidth of the one or more unallocated subchannels to a second bandwidth of the frequency band.

Aspect 3: The method of one of Aspects 1-2, wherein measuring the signal strength of only the one or more unallocated subchannels comprises measuring the signal strength of only the one or more unallocated subchannels excluding one or more frequency subbands within the one or more unallocated subchannels that are adjacent to the one or more allocated subchannels.

Aspect 4: The method of Aspect 3, wherein the threshold is based on a ratio of a first bandwidth of the one or more unallocated subchannels excluding the one or more frequency subbands to a second bandwidth of the frequency band.

Aspect 5: The method of Aspect 3, wherein a bandwidth of each of the one or more frequency subbands is fixed.

Aspect 6: The method of Aspect 3, wherein for each of the one or more frequency subbands, a corresponding bandwidth of the corresponding frequency subband is based on a corresponding signal strength of a corresponding signal received on a corresponding allocated subchannel adjacent to the corresponding frequency subband.

Aspect 7: The method of Aspect 3, wherein for each of the one or more frequency subbands, a corresponding bandwidth of the corresponding frequency subband is based on a corresponding distance between the first UE and a corresponding device allocated a corresponding allocated subchannel adjacent to the corresponding frequency subband.

Aspect 8: The method of one of Aspects 1-7, wherein: measuring the signal strength comprises: applying a filter bank to an input signal corresponding to the frequency band, the filter bank configured to filter the one or more allocated subchannels from the input signal; and measuring the signal strength of the filtered input signal.

Aspect 9: The method of one of Aspects 1-8, wherein the first time period and the second time period each comprise a slot.

Aspect 10: The method of one of Aspects 1-9, wherein the communication by the one or more devices corresponds to sidelink communications.

Aspect 11: The method of Aspect 10, wherein the one or more devices comprise cellular vehicle-to-everything (CV2X) devices.

Aspect 12: The method of one of Aspects 1-11, wherein the frequency band comprises an unlicensed band.

Aspect 13: An apparatus for wireless communications, comprising means for performing one or more of the methods of Aspects 1-12 or 29-41.

Aspect 14: An apparatus for wireless communications, comprising: a memory; and a processor coupled to the memory, the memory and the processor configured to perform the method of one or more of Aspects 1-12 or 29-41.

Aspect 15: A computer-readable medium, the medium including instructions that, when executed by a processing system, cause the processing system to perform the method of one or more of Aspects 1-12 or 29-41.

Aspect 16: An apparatus for wireless communications, comprising: a memory; a processor coupled to the memory, the processor and the memory being configured to receive one or more transmissions indicating one or more allocated subchannels of a frequency band that are allocated during a first time period, the frequency band comprising the one or more allocated subchannels and one or more unallocated subchannels during the first time period, sense the one or more unallocated subchannels for at least a portion of the first time period prior to a second time period, and transmit a signal within the frequency band during the second time period based on energy sensed for the one or more unallocated subchannels being less than a threshold.

Aspect 17: The apparatus of Aspect 16, wherein the threshold is based on a ratio of a first bandwidth of the one or more unallocated subchannels to a second bandwidth of the frequency band.

Aspect 18: The apparatus according to any one of Aspects 16 or 17, wherein the processor and the memory are further configured to sense only the one or more unallocated subchannels excluding one or more frequency subbands within the one or more unallocated subchannels that are adjacent to the one or more allocated subchannels.

Aspect 19: The apparatus of Aspect 18, wherein the threshold is based on a ratio of a first bandwidth of the one or more unallocated subchannels excluding the one or more frequency subbands to a second bandwidth of the frequency band.

Aspect 20: The apparatus according to any one of Aspects 18 or 19, wherein a bandwidth of each of the one or more frequency subbands is fixed.

Aspect 21: The apparatus according to any one of Aspects 18 or 19, wherein for each of the one or more frequency subbands, a corresponding bandwidth of the corresponding frequency subband is based on a corresponding signal strength of a corresponding signal received on a corresponding allocated subchannel adjacent to the corresponding frequency subband.

Aspect 22: The apparatus according to any one of Aspects 18, 19, or 21, wherein for each of the one or more frequency subbands, a corresponding bandwidth of the corresponding frequency subband is based on a corresponding distance between the first UE and a corresponding device allocated a corresponding allocated subchannel adjacent to the corresponding frequency subband.

Aspect 23: The apparatus according to any one of Aspects 16-22, wherein the processor and the memory are further configured to: apply a filter bank to an input signal corresponding to the frequency band, the filter bank configured to filter the one or more allocated subchannels from the input signal, and sense the filtered input signal.

Aspect 24: The apparatus according to any one of Aspects 16-23, wherein the first time period and the second time period each comprise a slot.

Aspect 25: The apparatus according to any one of Aspects 16-24, wherein a channel occupancy time (COT) includes the first time period and the second time period.

Aspect 26: The apparatus according to any one of Aspects 16-25, wherein the processor and the memory are further configured to transmit the signal via a sidelink channel.

Aspect 27: The apparatus according to any one of Aspects 16-26, wherein the apparatus comprises a cellular vehicle-to-everything (CV2X) device.

Aspect 28: The apparatus according to any one of Aspects 16-27, wherein the frequency band comprises an unlicensed band.

Aspect 29: A method for wireless communications performed by a user equipment (UE), comprising: receiving one or more transmissions indicating one or more allocated subchannels of a frequency band that are allocated during a first time period, the frequency band comprising the one or more allocated subchannels and one or more unallocated subchannels during the first time period; sensing the one or more unallocated subchannels for at least a portion of the first time period prior to a second time period; and based on energy sensed for the one or more unallocated subchannels being less than a threshold, transmitting a signal within the frequency band during the second time period.

Aspect 30: The method of Aspect 29, wherein the threshold is based on a ratio of a first bandwidth of the one or more unallocated subchannels to a second bandwidth of the frequency band.

Aspect 31: The method according to any one of Aspects 29 or 30, wherein sensing only the one or more unallocated subchannels comprises sensing only the one or more unallocated subchannels excluding one or more frequency subbands within the one or more unallocated subchannels that are adjacent to the one or more allocated subchannels.

Aspect 32: The method of Aspect 31, wherein the threshold is based on a ratio of a first bandwidth of the one or more unallocated subchannels excluding the one or more frequency subbands to a second bandwidth of the frequency band.

Aspect 33: The method according to any one of Aspects 31 or 32, wherein a bandwidth of each of the one or more frequency subbands is fixed.

Aspect 34: The method according to any one of Aspects 31 or 32, wherein for each of the one or more frequency subbands, a corresponding bandwidth of the corresponding frequency subband is based on a corresponding signal strength of a corresponding signal received on a corresponding allocated subchannel adjacent to the corresponding frequency subband.

Aspect 35: The method according to any one of Aspects 31, 32, or 34, wherein for each of the one or more frequency subbands, a corresponding bandwidth of the corresponding frequency subband is based on a corresponding distance between the first UE and a corresponding device allocated a corresponding allocated subchannel adjacent to the corresponding frequency subband.

Aspect 36: The method according to any one of Aspects 29-35, wherein sensing comprises: applying a filter bank to an input signal corresponding to the frequency band, the filter bank configured to filter the one or more allocated subchannels from the input signal; and sensing the filtered input signal.

Aspect 37: The method according to any one of Aspects 29-36, wherein the first time period and the second time period each comprise a slot.

Aspect 38: The method according to any one of Aspects 29-37, wherein a channel occupancy time (COT) includes the first time period and the second time period.

Aspect 39: The method according to any one of Aspects 29-38, wherein transmitting the signal comprises transmitting the signal via a sidelink channel.

Aspect 40: The method according to any one Aspects 29-39, wherein the UE comprises a cellular vehicle-to-everything (CV2X) device.

Aspect 41: The method according to any one of Aspects 29-40, wherein the frequency band comprises an unlicensed band.

Aspect 42: An apparatus for wireless communications, comprising: means for receiving one or more transmissions indicating one or more allocated subchannels of a frequency band that are allocated during a first time period, the frequency band comprising the one or more allocated subchannels and one or more unallocated subchannels during the first time period; means for sensing the one or more unallocated subchannels for at least a portion of the first time period prior to a second time period; means for transmitting a signal within the frequency band during the second time period based on energy sensed for the one or more unallocated subchannels being less than a threshold.

Aspect 43: The apparatus of Aspect 42, wherein the threshold is based on a ratio of a first bandwidth of the one or more unallocated subchannels to a second bandwidth of the frequency band.

Aspect 44: A computer-readable medium having instructions stored thereon that when executed by an apparatus, cause the apparatus to perform: receiving one or more transmissions indicating one or more allocated subchannels of a frequency band that are allocated during a first time period, the frequency band comprising the one or more allocated subchannels and one or more unallocated subchannels during the first time period; sensing the one or more unallocated subchannels for at least a portion of the first time period prior to a second time period; transmitting a signal within the frequency band during the second time period based on energy sensed for the one or more unallocated subchannels being less than a threshold.

Aspect 45: The computer-readable medium of Aspect 44, wherein the threshold is based on a ratio of a first bandwidth of the one or more unallocated subchannels to a second bandwidth of the frequency band.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

Within the present document, the term "user equipment (UE)" or "CV2X device" broadly refers to a diverse array of devices and technologies. UEs and CV2X devices may include a number of hardware structural components sized, shaped, and arranged to help in communication; such components can include antennas, antenna arrays, RF chains, amplifiers, one or more processors, etc. electrically coupled to each other. For example, some non-limiting examples of a UE or CV2X device include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A UE or CV2X device may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A UE or CV2X device may additionally be a digital home or smart home device such as a home audio, video, and/or multimedia device, an appliance, a vending machine, intelligent lighting, a home security system, a smart meter, etc. A UE or CV2X device may additionally be a smart energy device, a security device, a solar panel or solar array, a municipal infrastructure device (e.g., a smart grid, public Wi-Fi, etc.), an industrial automation and enterprise device, a logistics controller, agricultural equipment, military defense equipment: vehicles, aircraft, ships, and weaponry, etc. Still further, a UE or CV2X device may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software.

Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 16 and/or 17.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications at a user equipment (UE), the apparatus comprising:

one or more memories; and one or more processors coupled with the one or more memories and configured to cause the UE to:

receive one or more transmissions that indicate one or more allocated subchannels of a frequency band that are allocated during a first time period, the frequency band comprising the one or more allocated subchannels and one or more unallocated subchannels during the first time period;

sense only the one or more unallocated subchannels for at least a portion of the first time period prior to a second time period; and transmit a signal within the frequency band during the second time period based on a determination that energy sensed for the one or more unallocated subchannels is less than a threshold.

2. The apparatus of claim 1, wherein the threshold is based on a ratio of a first bandwidth of the one or more unallocated subchannels to a second bandwidth of the frequency band.

3. The apparatus of claim 1, wherein to cause the UE to sense only the one or more unallocated subchannels, the one or more processors are configured to cause the UE to exclude sensing of one or more frequency subbands, within the one or more unallocated subchannels, that are adjacent to the one or more allocated subchannels.

4. The apparatus of claim 3, wherein the threshold is based on a ratio of a first bandwidth of the one or more unallocated subchannels excluding the one or more frequency subbands to a second bandwidth of the frequency band.

5. The apparatus of claim 3, wherein a bandwidth of each of the one or more frequency subbands is fixed.

6. The apparatus of claim 3, wherein for each of the one or more frequency subbands, a corresponding bandwidth of a corresponding frequency subband is based on a corresponding signal strength of a corresponding signal received on a corresponding allocated subchannel adjacent to the corresponding frequency subband.

7. The apparatus of claim 3, wherein for each of the one or more frequency subbands, a corresponding bandwidth of a corresponding frequency subband is based on a corresponding distance between the UE and a corresponding device allocated a corresponding allocated subchannel adjacent to the corresponding frequency subband.

8. The apparatus of claim 1, wherein the one or more processors are further configured to cause the UE to:

apply a filter bank to an input signal corresponding to the frequency band, the filter bank configured to filter the one or more allocated subchannels from the input signal, and sense the input signal after the filter bank is applied.

9. The apparatus of claim 1, wherein the first time period and the second time period each comprises a slot.

10. The apparatus of claim 1, wherein a channel occupancy time (COT) includes the first time period and the second time period.

11. The apparatus of claim 1, wherein the one or more processors are configured to cause the UE to transmit the signal via a sidelink channel.

12. The apparatus of claim 11, wherein the UE comprises a cellular vehicle-to-everything (CV2X) device.

13. The apparatus of claim 1, wherein the frequency band comprises an unlicensed band.

14. A method for wireless communications performed by a user equipment (UE), the method comprising:

receiving one or more transmissions indicating one or more allocated subchannels of a frequency band that are allocated during a first time period, the frequency band comprising the one or more allocated subchannels and one or more unallocated subchannels during the first time period;

sensing only the one or more unallocated subchannels for at least a portion of the first time period prior to a second time period; and transmitting a signal within the frequency band during the second time period based on energy sensed for the one or more unallocated subchannels being less than a threshold.

15. The method of claim 14, wherein the threshold is based on a ratio of a first bandwidth of the one or more unallocated subchannels to a second bandwidth of the frequency band.

16. The method of claim 14, wherein sensing only the one or more unallocated subchannels comprises sensing the one or more unallocated subchannels excluding sensing of one or more frequency subbands, within the one or more unallocated subchannels, that are adjacent to the one or more allocated subchannels.

17. The method of claim 16, wherein the threshold is based on a ratio of a first bandwidth of the one or more unallocated subchannels excluding the one or more frequency subbands to a second bandwidth of the frequency band.

18. The method of claim 16, wherein a bandwidth of each of the one or more frequency subbands is fixed.

19. The method of claim 16, wherein for each of the one or more frequency subbands, a corresponding bandwidth of a corresponding frequency subband is based on a corresponding signal strength of a corresponding signal received on a corresponding allocated subchannel adjacent to the corresponding frequency subband.

20. The method of claim 16, wherein for each of the one or more frequency subbands, a corresponding bandwidth of a corresponding frequency subband is based on a corresponding distance between the UE and a corresponding device allocated a corresponding allocated subchannel adjacent to the corresponding frequency subband.

21. The method of claim 14, wherein the sensing comprises:

applying a filter bank to an input signal corresponding to the frequency band, the filter bank configured to filter the one or more allocated subchannels from the input signal; and sensing the input signal after applying the filter bank.

22. The method of claim 14, wherein the first time period and the second time period each comprises a slot.

23. The method of claim 14, wherein a channel occupancy time (COT) includes the first time period and the second time period.

24. The method of claim 14, wherein transmitting the signal is via a sidelink channel.

25. The method of claim 24, wherein the UE comprises a cellular vehicle-to-everything (CV2X) device.

26. The method of claim 14, wherein the frequency band comprises an unlicensed band.

27. An apparatus for wireless communications, the apparatus comprising:

means for receiving one or more transmissions indicating one or more allocated subchannels of a frequency band that are allocated during a first time period, the frequency band comprising the one or more allocated subchannels and one or more unallocated subchannels during the first time period;

means for sensing only the one or more unallocated subchannels for at least a portion of the first time period prior to a second time period; and means for transmitting a signal within the frequency band during the second time period based on energy sensed for the one or more unallocated subchannels being less than a threshold.

28. The apparatus of claim 27, wherein the threshold is based on a ratio of a first bandwidth of the one or more unallocated subchannels to a second bandwidth of the frequency band.

29. A non-transitory computer-readable storage medium having instructions stored thereon that, when executed by an apparatus, cause the apparatus to perform operations including:

receiving one or more transmissions indicating one or more allocated subchannels of a frequency band that are allocated during a first time period, the frequency band comprising the one or more allocated subchannels and one or more unallocated subchannels during the first time period;

sensing only the one or more unallocated subchannels for at least a portion of the first time period prior to a second time period; and transmitting a signal within the frequency band during the second time period based on energy sensed for the one or more unallocated subchannels being less than a threshold.

30. The non-transitory computer-readable storage medium of claim 29, wherein the threshold is based on a ratio of a first bandwidth of the one or more unallocated subchannels to a second bandwidth of the frequency band.

\* \* \* \* \*